United States Patent
Uramoto et al.

(10) Patent No.: US 10,252,213 B2
(45) Date of Patent: Apr. 9, 2019

(54) DEHUMIDIFICATION DEVICE

(71) Applicants: Sharp Kabushiki Kaisha, Sakai, Osaka (JP); THE SCHOOL CORPORATION KANSAI UNIVERSITY, Suita-shi, Osaka (JP)

(72) Inventors: Yoshihiro Uramoto, Sakai (JP); Nobuki Sakikawa, Sakai (JP); Takashi Miyata, Suita (JP)

(73) Assignees: SHARP KABUSHIKI KAISHA, Sakai (JP); THE SCHOOL CORPORATION KANSAI UNIVERSITY, Osaka (JP)

( * ) Notice: Subject to any disclaimer, the term of this patent is extended or adjusted under 35 U.S.C. 154(b) by 82 days.

(21) Appl. No.: 15/504,711

(22) PCT Filed: Aug. 27, 2015

(86) PCT No.: PCT/JP2015/074229
§ 371 (c)(1),
(2) Date: Feb. 17, 2017

(87) PCT Pub. No.: WO2016/059888
PCT Pub. Date: Apr. 21, 2016

(65) Prior Publication Data
US 2017/0266605 A1    Sep. 21, 2017

(30) Foreign Application Priority Data

Oct. 14, 2014   (JP) .................................. 2014-210251

(51) Int. Cl.
*B01D 53/06* (2006.01)
*B01D 53/26* (2006.01)
(Continued)

(52) U.S. Cl.
CPC ............. *B01D 53/06* (2013.01); *B01D 53/26* (2013.01); *B01D 53/261* (2013.01); *B01D 53/28* (2013.01);
(Continued)

(58) Field of Classification Search
CPC ...... B01D 53/06; B01D 53/261; B01D 53/26; B01D 53/28; B01D 2253/202;
(Continued)

(56) References Cited

U.S. PATENT DOCUMENTS 5,534,186 A * 7/1996 Walker ................. B01D 53/261
                                                    252/194
6,269,654 B1 * 8/2001 Murray ..................... B32B 3/04
                                                    62/457.1
(Continued)

FOREIGN PATENT DOCUMENTS

JP    2000-126540 A    5/2000
JP    2004-069257 A    3/2004
(Continued)

OTHER PUBLICATIONS

Machine-generated English translation of JP 2004-069257 A, published Mar. 2004.*
(Continued)

*Primary Examiner* — Frank M Lawrence, Jr.
(74) *Attorney, Agent, or Firm* — Keating & Bennett, LLP

(57) ABSTRACT

Provided is a dehumidification apparatus with good energy efficiency. A moisture absorbing material (polymeric moisture absorbing material 24), which absorbs moisture and swells at a temperature not higher than a predetermined temperature sensitive point, while shrinking and releasing condensed water at a temperature higher than the temperature sensitive point as a result of phase transition, is formed so as to be divided into a plurality of segments which are (Continued)

made apart from each other during dehydration. A rotation motor (21) is used to move the moisture absorbing material (polymeric moisture absorbing material 24) between a moisture absorption region (14*a*) and a dehydration region (14*b*). In the dehydration region (14*b*), the moisture absorbing material (polymeric moisture absorbing material 24) is heated by the heater (25).

8 Claims, 22 Drawing Sheets

(51) Int. Cl.
  *B01D 53/28* (2006.01)
  *B01J 20/26* (2006.01)
  *B01J 20/34* (2006.01)
  *F24F 3/14* (2006.01)
  *F24F 1/02* (2019.01)
(52) U.S. Cl.
  CPC ......... *B01J 20/261* (2013.01); *B01J 20/3425* (2013.01); *B01J 20/3483* (2013.01); *F24F 3/1423* (2013.01); *B01D 2253/202* (2013.01); *B01D 2257/80* (2013.01); *B01D 2258/06* (2013.01); *F24F 1/02* (2013.01); *F24F 2003/144* (2013.01); *F24F 2003/1464* (2013.01); *F24F 2203/1032* (2013.01)
(58) Field of Classification Search
  CPC ............. B01D 2257/80; B01D 2258/06; B01J 20/261; B01J 20/3425; B01J 20/3483; F24F 1/02; F24F 3/1423; F24F 2003/144; F24F 2003/1464; F24F 2003/1032
  USPC .... 95/126; 96/121, 125, 143, 146, 149, 154; 34/80, 472, 473
  See application file for complete search history.

(56) References Cited

U.S. PATENT DOCUMENTS

| | | | |
|---|---|---|---|
| 6,793,713 B2* | 9/2004 | Kretsinger | ........... B01D 53/261 95/117 |
| 2017/0276380 A1* | 9/2017 | Sakikawa | ................ B01J 20/24 |

FOREIGN PATENT DOCUMENTS

| | | |
|---|---|---|
| JP | 2010-069428 A | 4/2010 |
| JP | 2014-062731 A | 4/2014 |

OTHER PUBLICATIONS

Machine-generated English translation of JP 2014-062731 A, published Apr. 2014.*
Official Communication issued in International Patent Application No. PCT/JP2015/074229, dated Oct. 13, 2015.

* cited by examiner

F I G. 1
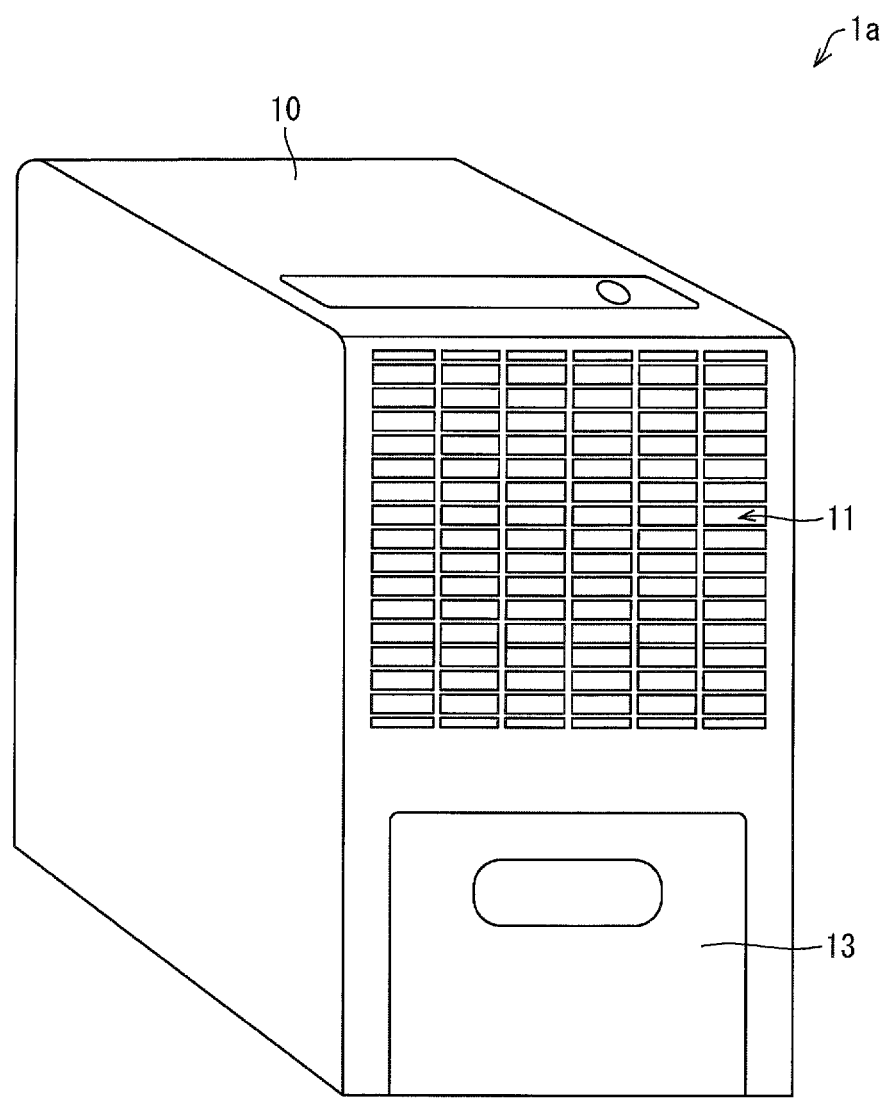

FIG. 4
(a) During moisture absorption
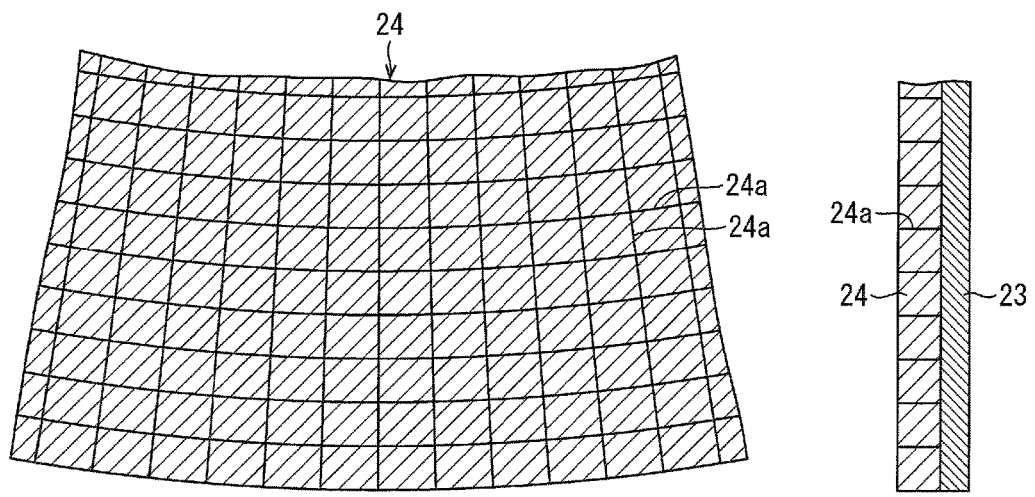
(b) During moisture desorption
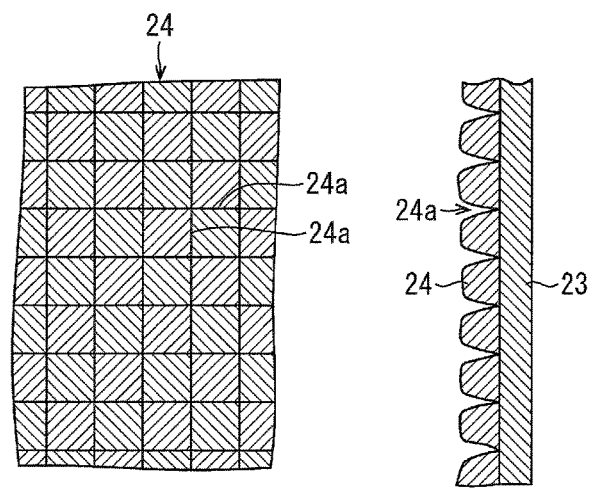

FIG. 5
(a) Comparative Example 1: During moisture absorption
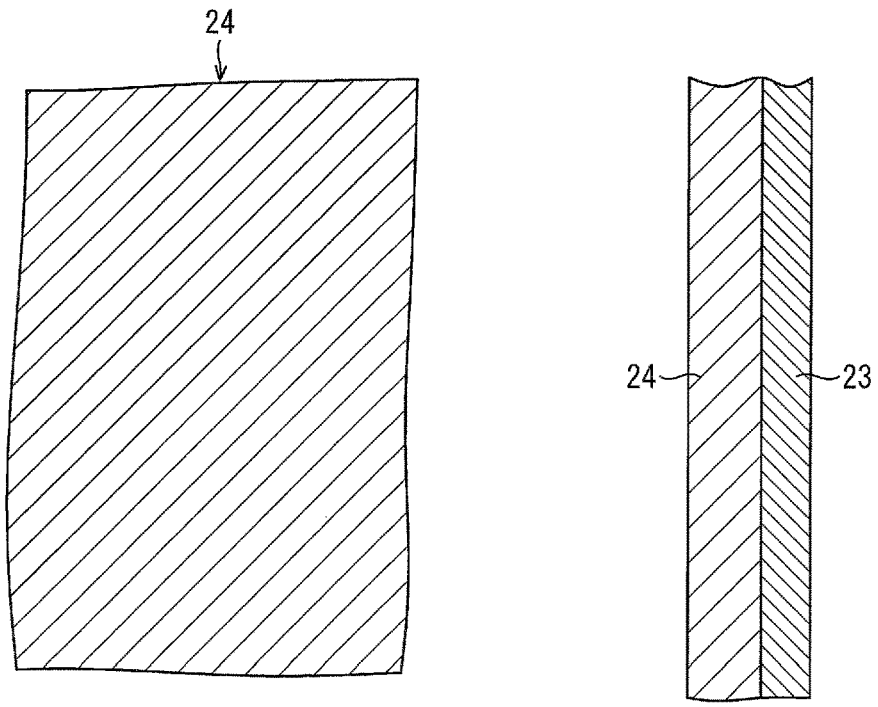
(b) Comparative Example 1: During moisture desorption
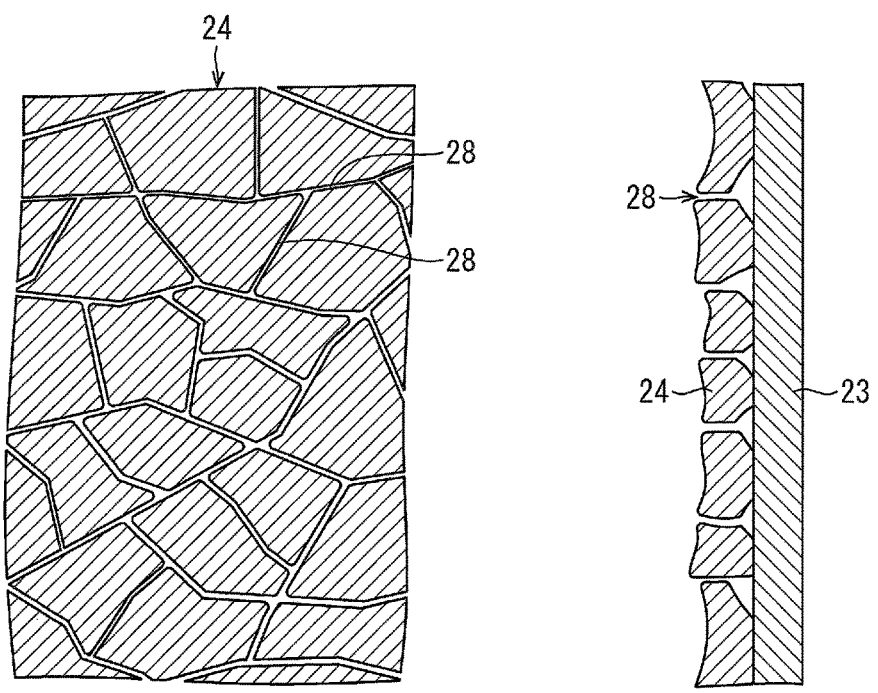

FIG. 8
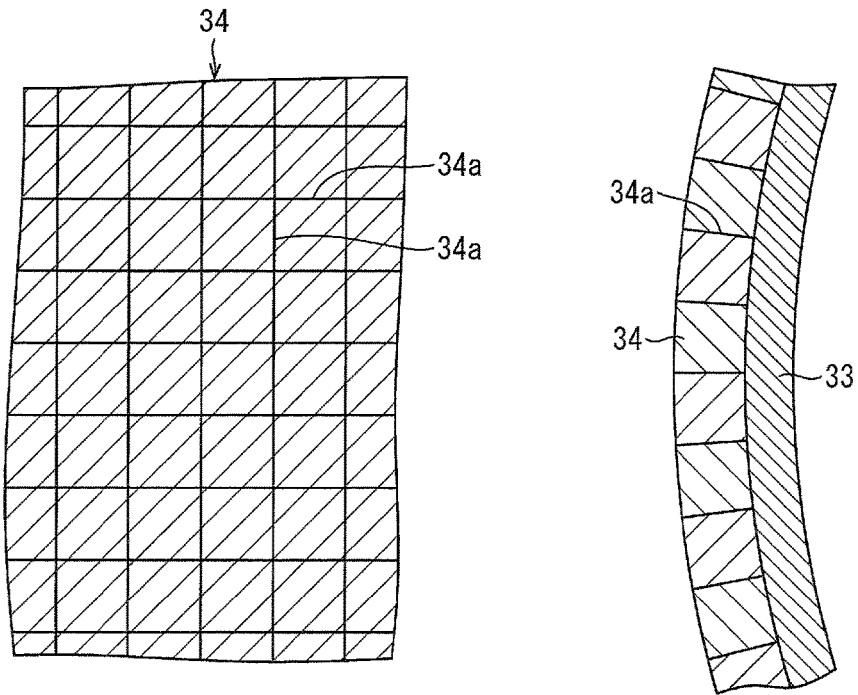
(a) During moisture absorption
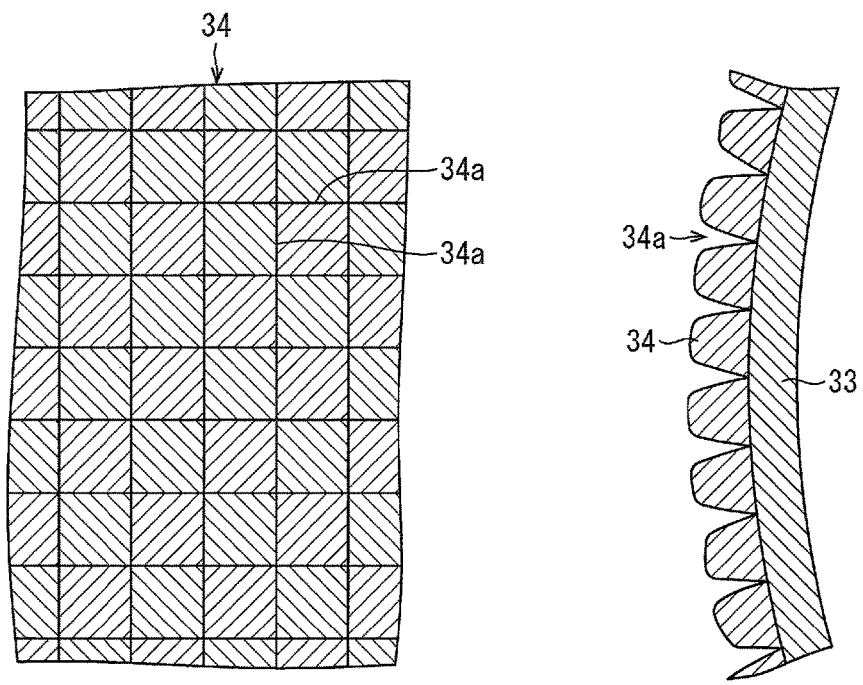
(b) During moisture desorption FIG. 9
(a) Comparative Example 2: During moisture absorption
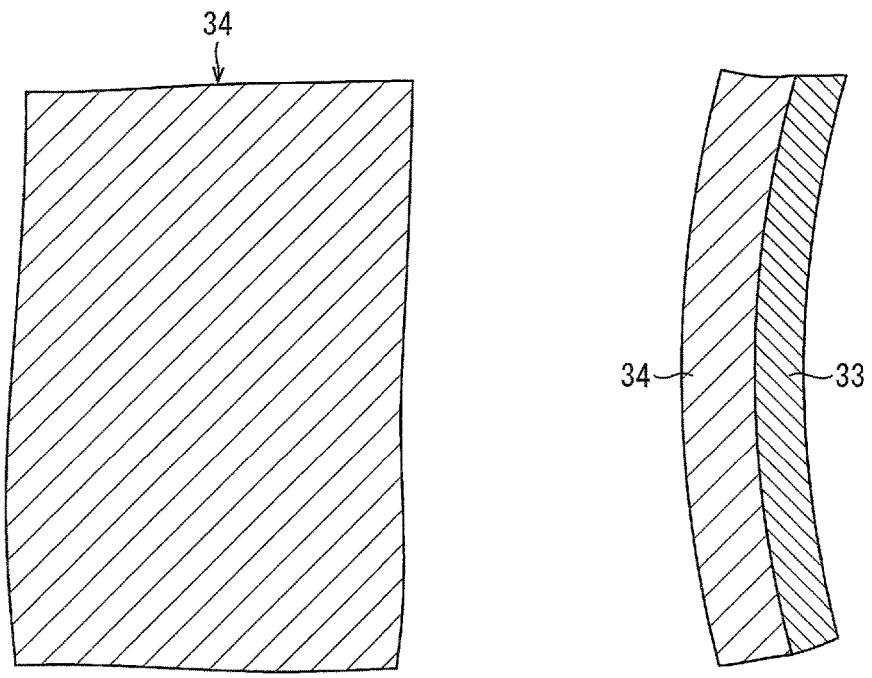
(b) Comparative Example 2: During moisture desorption
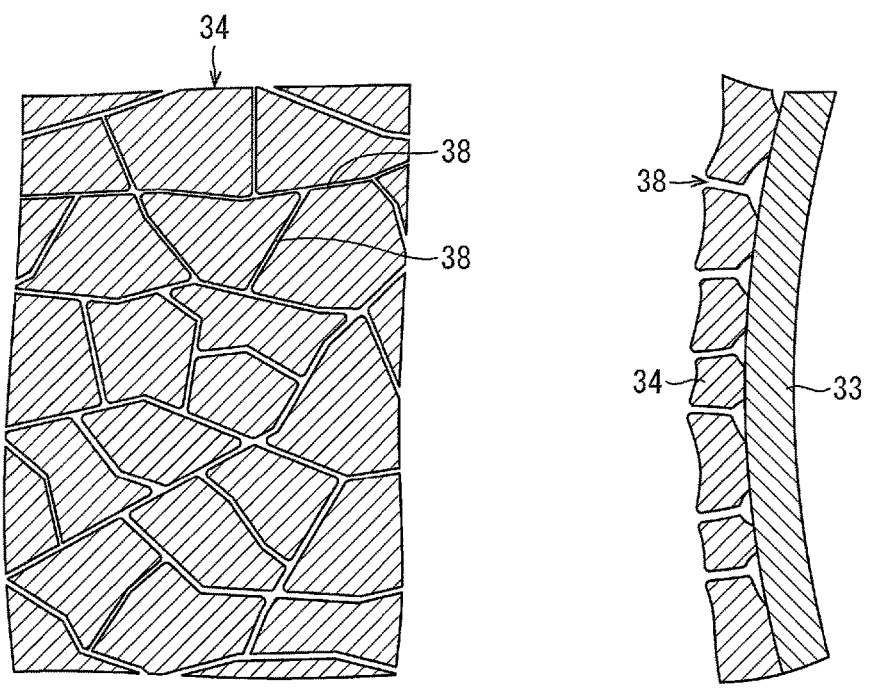

F I G. 1 2
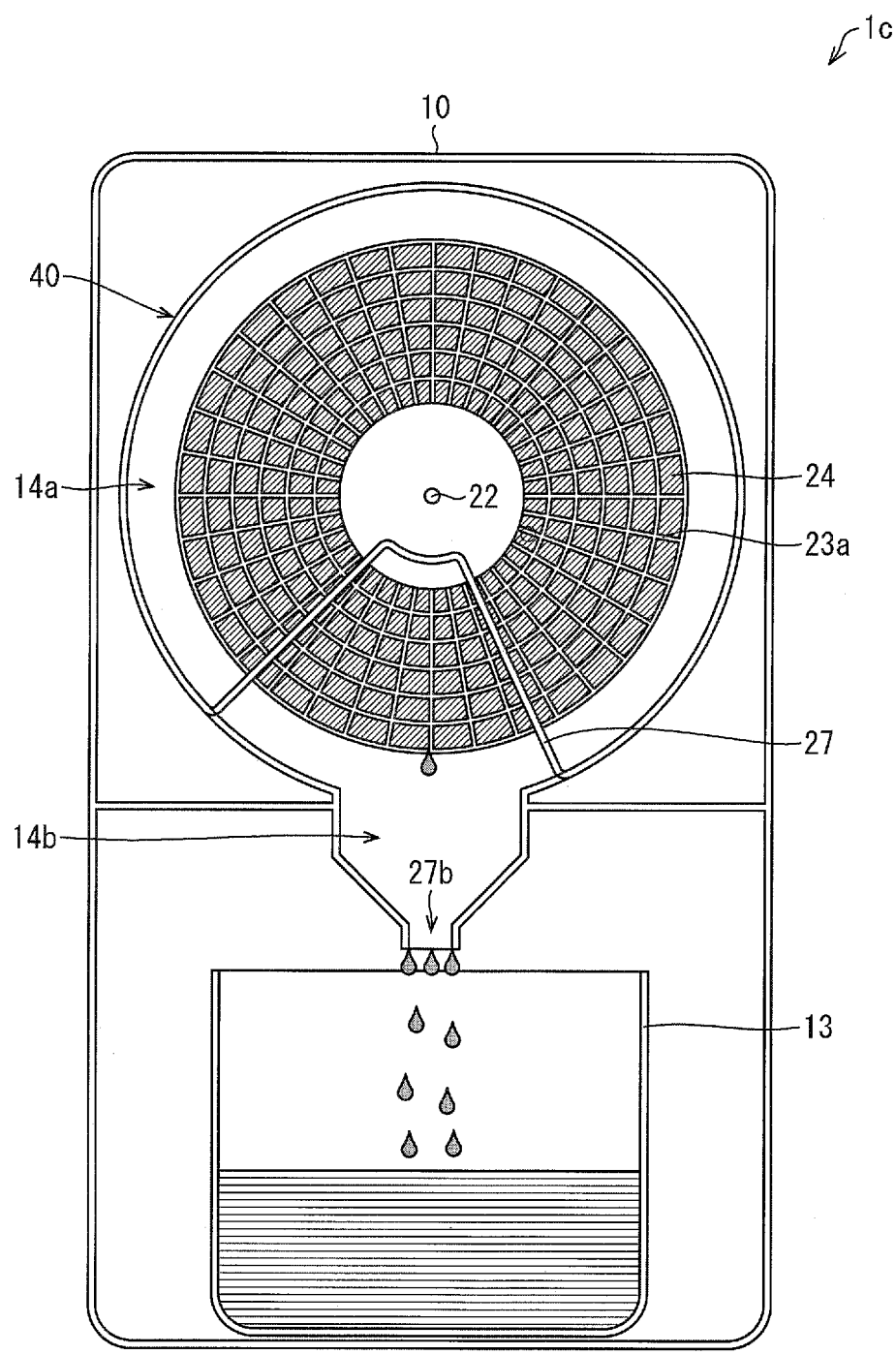

FIG. 13
(a) During moisture absorption
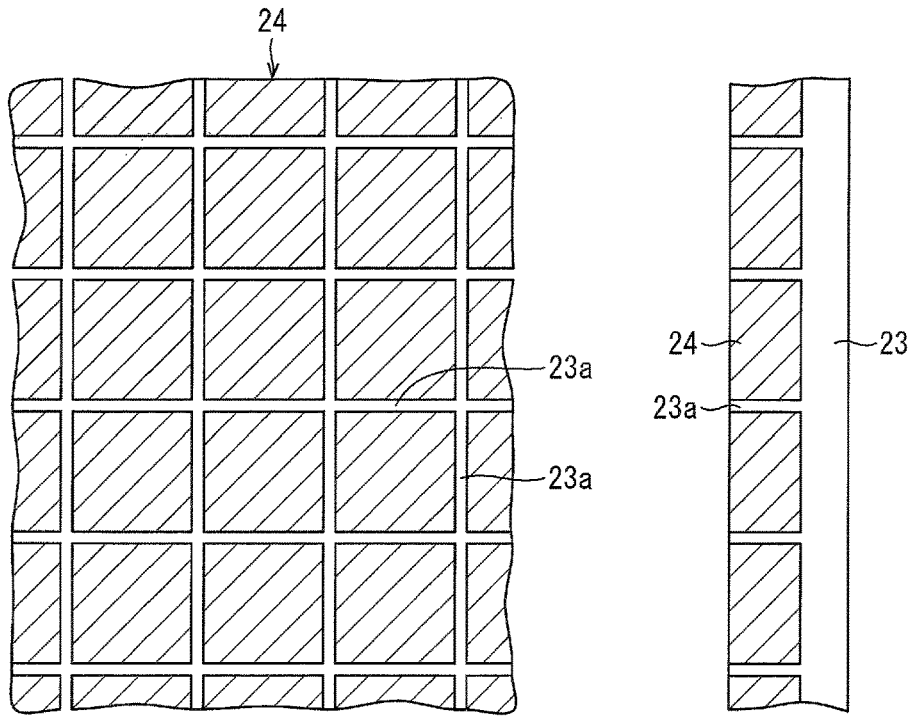
(b) During moisture desorption
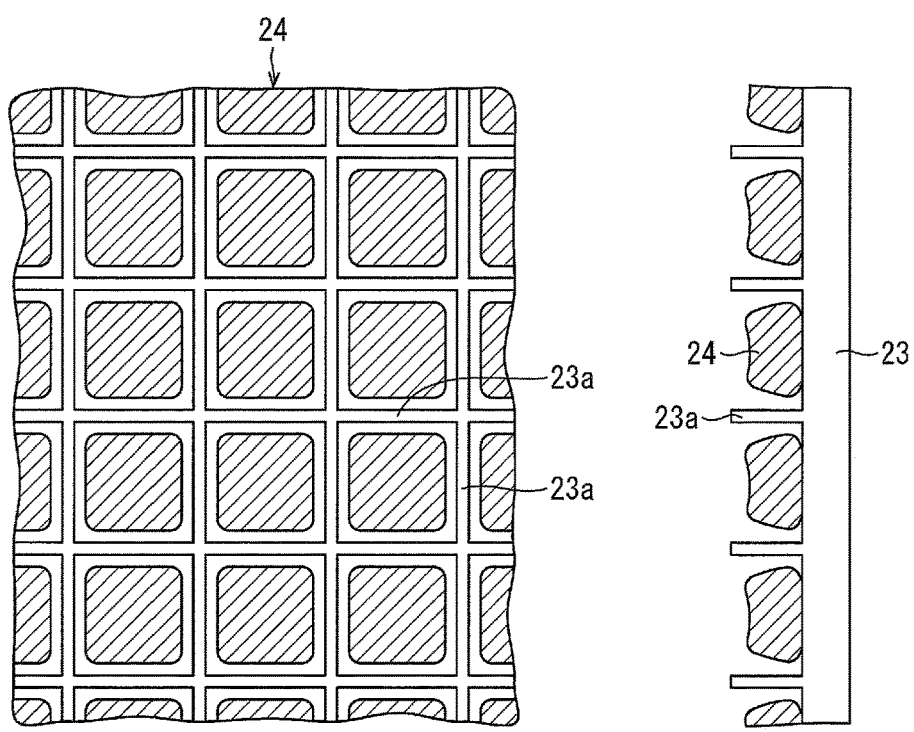

FIG. 14
(a) During moisture absorption
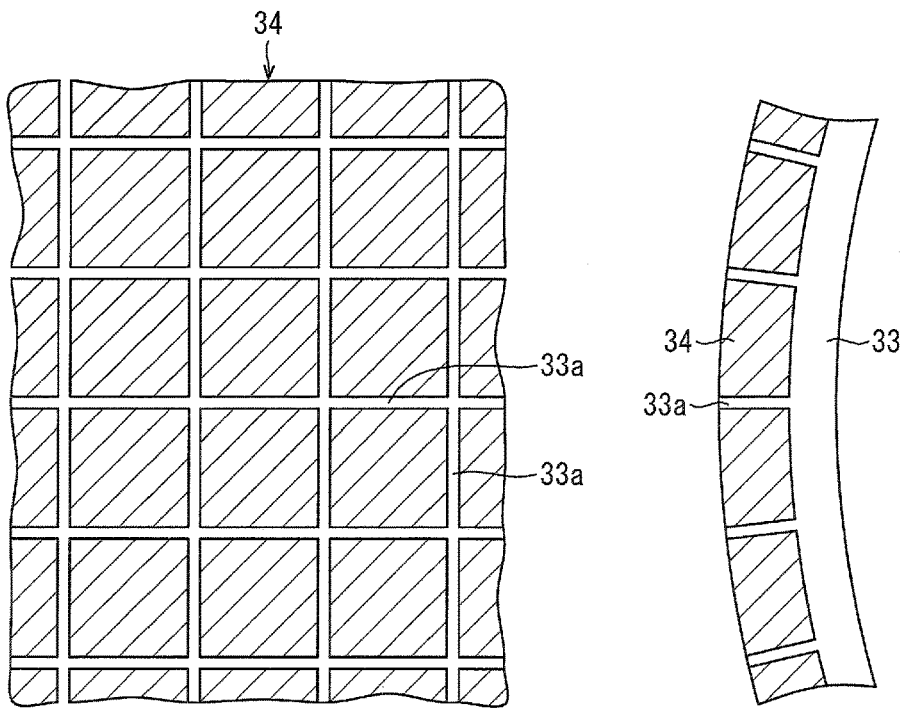
(b) During moisture desorption
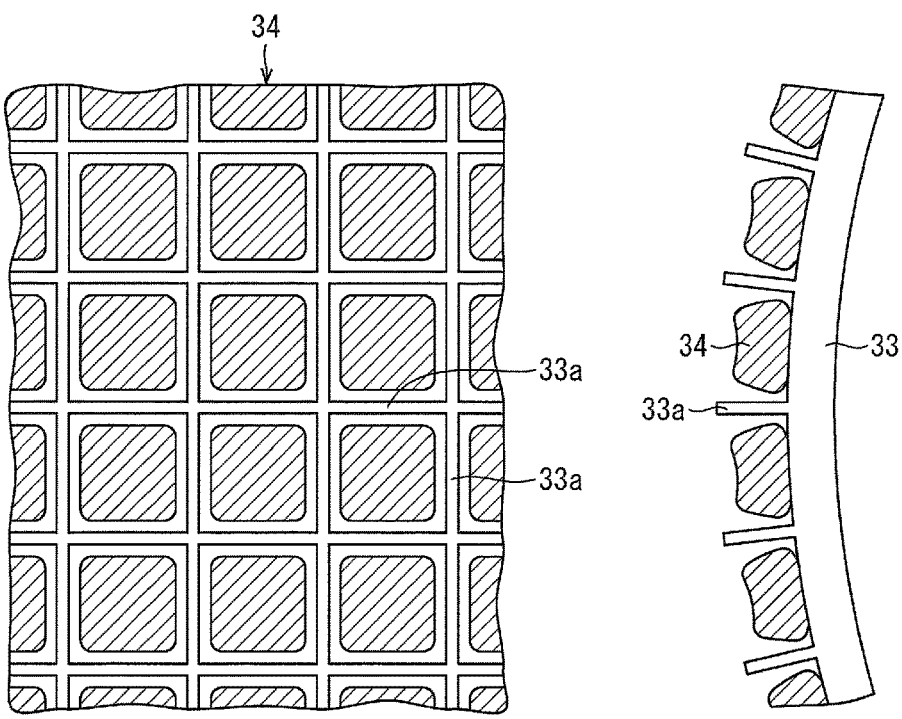

DEHUMIDIFICATION DEVICE

TECHNICAL FIELD

The present invention relates to a dehumidification apparatus in which a moisture absorbing material is used.

BACKGROUND ART

Conventionally, as a dehumidification apparatus using a moisture absorbing material is known a desiccant dehumidification apparatus (see, for example, Patent Literatures 1 and 2).

The desiccant dehumidification apparatus dehumidifies indoor air as follows. That is, (i) a moisture absorbing material, such as zeolite or silica gel, applied to a permeable rotor (e.g., a honeycomb rotor) is exposed to the indoor air so that the moisture absorbing material adsorbs moisture in the air, (ii) the moisture absorbing material, which has thus adsorbed the moisture is exposed to a warm wind heated by a heater so that the adsorbed moisture is released as water vapor, and (iii) a high-temperature air containing the water vapor is cooled by a heat exchanger to take out the moisture.

CITATION LIST

Patent Literature

[Patent Literature 1]
Japanese Patent Application Publication Tokukai No. 2000-126540 (Publication date: May 9, 2000)
[Patent Literature 2]
Japanese Patent Application Publication Tokukai No. 2010-69428 (Publication date: Apr. 2, 2010)

SUMMARY OF INVENTION

Technical Problem

Unfortunately, the conventional desiccant dehumidification apparatus needs a large amount of thermal energy to carry out a heating treatment for allowing moisture adsorbed by the moisture absorbing material to be released as water vapor. The conventional desiccant dehumidification apparatus also needs the cooling treatment for changing water vapor released from the moisture absorbing material into water. Thus, the amount of energy consumed increases accordingly.

The present invention has been accomplished in view of the above problem. It is an object of the present invention to provide a dehumidification apparatus with good energy efficiency.

Solution to Problem

A dehumidification apparatus in accordance with one aspect of the present invention includes: a substrate; a moisture absorbing material attached to the substrate; and a driving member which repeatedly moves the moisture absorbing material between a moisture absorption region and a dehydration region, the dehumidification apparatus allowing moisture absorbed by the moisture absorbing material in the moisture absorption region to be released as water in liquid form in the dehydration region, the moisture absorbing material being made from a material that absorbs moisture and swells at a temperature not higher than a predetermined temperature sensitive point, while shrinking and releasing water in liquid form at a temperature higher than the temperature sensitive point, the dehumidification apparatus further including a heating member which heats the moisture absorbing material to the temperature higher than the temperature sensitive point in the dehydration region, the moisture absorbing material being divided into a plurality of segments on the substrate.

Advantageous Effects of Invention

Unlike the conventional desiccant dehumidification apparatus described earlier, the dehumidification apparatus having the above configuration eliminates the need for the heating treatment for allowing moisture adsorbed by the moisture absorbing material to be released as water vapor and the cooling treatment for changing water vapor released from the moisture absorbing material into water. Thus, it is possible to enhance energy efficiency. Further, with the moisture absorbing material divided into a plurality of segments, clearances are generated between the individual segments of the moisture absorbing material during dehydration. This makes it possible to increase surface area of the moisture absorbing material, thereby enhancing the efficiency in absorbing moisture. Further, the moisture absorbing material divided into a plurality of segments reduces stress acting on the moisture absorbing material when the moisture absorbing material shrinks during dehydration. This makes it possible to prevent the occurrence of irregular cracks in the moisture absorbing material and to prevent the moisture absorbing material from being peeled off from the substrate.

BRIEF DESCRIPTION OF DRAWINGS

FIG. 1 is a perspective view illustrating an external appearance of a dehumidification apparatus in accordance with Embodiment 1 of the present invention.

FIG. 4 is a view illustrating a polymeric moisture absorbing material provided in the dehumidification apparatus illustrated in FIG. 1, wherein (a) of FIG. 4 illustrates a state of the polymeric moisture absorbing material during moisture absorption, and (b) of FIG. 4 illustrates a state of the polymeric moisture absorbing material during dehydration.

FIG. 5 is a view illustrating a polymeric moisture absorbing material in accordance with a Comparative Example, wherein (a) of FIG. 5 illustrates a state of the polymeric moisture absorbing material during moisture absorption, and (b) of FIG. 5 illustrates a state of the polymeric moisture absorbing material during dehydration.

FIG. 8 is a view illustrating a polymeric moisture absorbing material provided in the dehumidification apparatus illustrated in FIG. 6, wherein (a) of FIG. 8 illustrates a state of the polymeric moisture absorbing material during moisture absorption, and (b) of FIG. 8 illustrates a state of the polymeric moisture absorbing material during dehydration.

FIG. 9 is a view illustrating a polymeric moisture absorbing material in accordance with a Comparative Example, wherein (a) of FIG. 9 illustrates a state of the polymeric moisture absorbing material during moisture absorption, and (b) of FIG. 9 illustrates a state of the polymeric moisture absorbing material during dehydration.

FIG. 12 is a cross-sectional view illustrating a cross section of the dehumidification apparatus illustrated in FIG. 11, taken vertically to the direction of the air flow in the dehumidification apparatus.

FIG. 13 is a view illustrating a polymeric moisture absorbing material provided in the dehumidification apparatus illustrated in FIG. 11, wherein (a) of FIG. 13 illustrates a state of the polymeric moisture absorbing material during moisture absorption, and (b) of FIG. 13 illustrates a state of the polymeric moisture absorbing material during dehydration.

FIG. 14 is a view illustrating a polymeric moisture absorbing material provided in a variation of the dehumidification apparatus illustrated in FIG. 11, wherein (a) of FIG. 14 illustrates a state of the polymeric moisture absorbing material during moisture absorption, and (b) of FIG. 14 illustrates a state of the polymeric moisture absorbing material during dehydration.

DESCRIPTION OF EMBODIMENTS

Embodiment 1

An embodiment of the present invention is described below.

Figure 2:
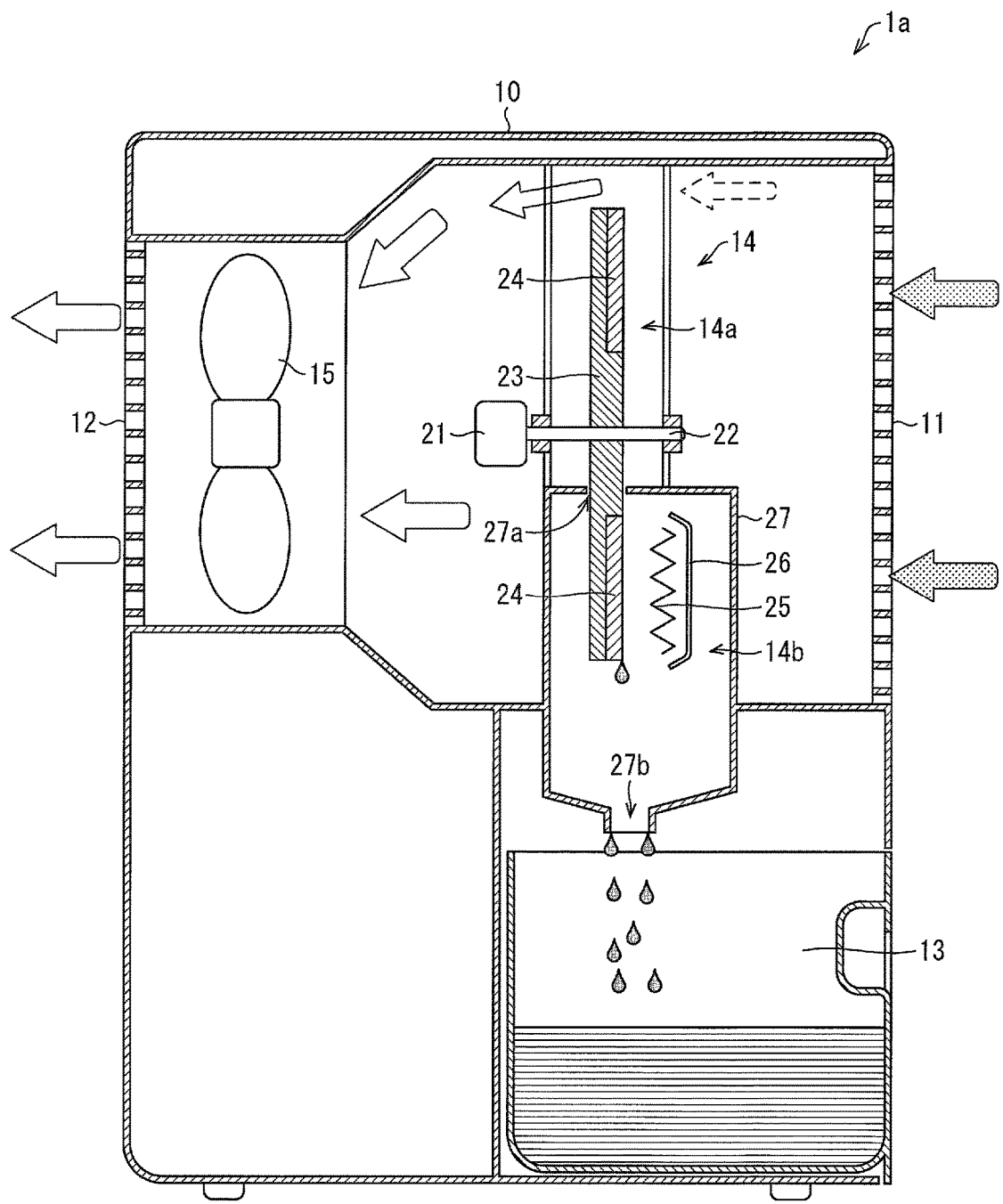
FIG. 2 is a cross-sectional view illustrating a cross section of the dehumidification apparatus illustrated in FIG. 1, taken parallel to a direction of an air flow in the dehumidification apparatus.
Figure 3:
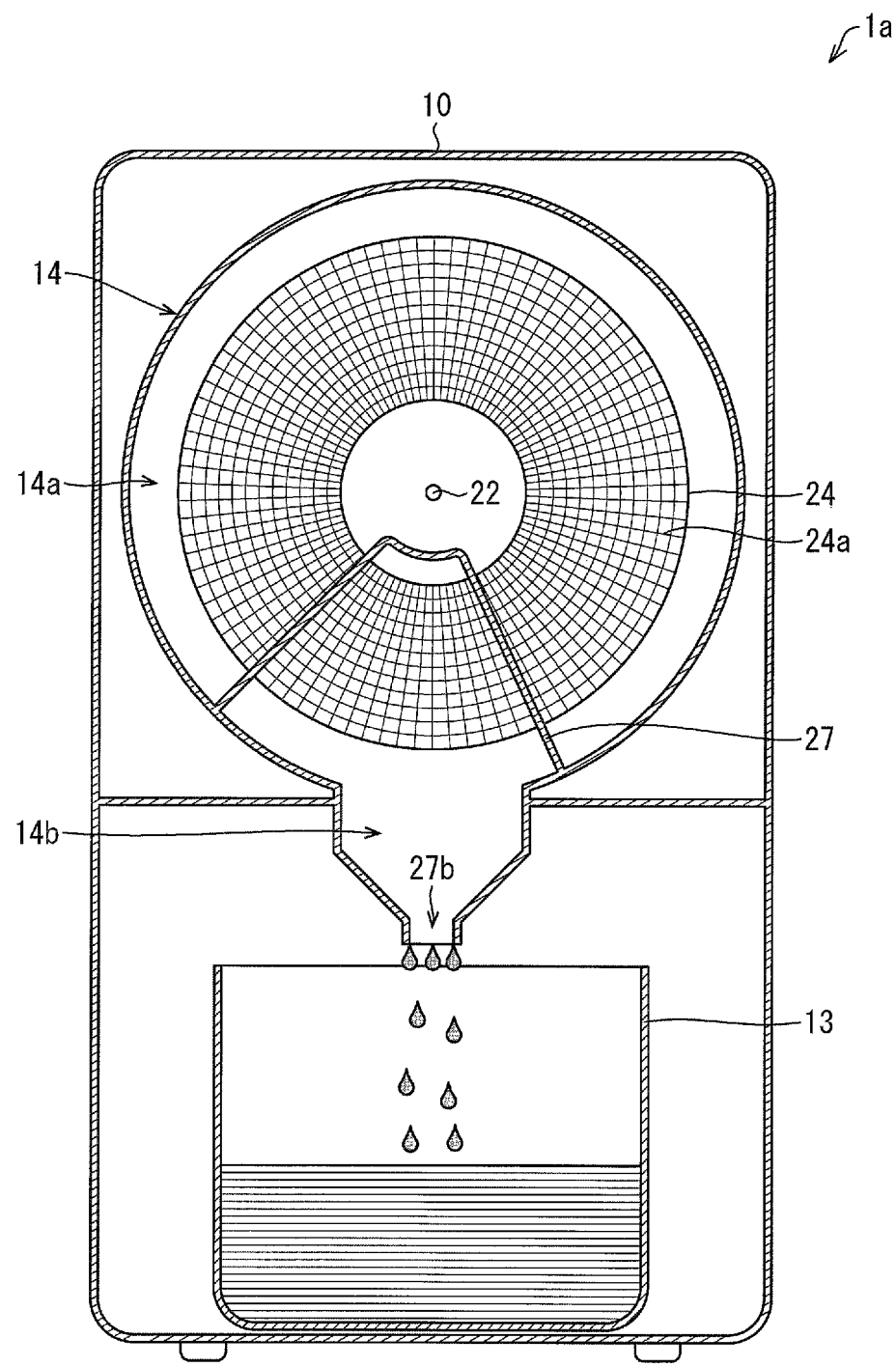
FIG. 3 is a cross-sectional view illustrating a cross section of the dehumidification apparatus illustrated in FIG. 1, taken vertically to the direction of the air flow in the dehumidification apparatus.

FIG. 1 is a perspective view illustrating an external appearance of a dehumidification apparatus 1a in accordance with the present embodiment. FIG. 2 is a cross-sectional view illustrating a cross section of the dehumidification apparatus 1a taken parallel to a direction of an air flow in the dehumidification apparatus 1a. FIG. 3 is a cross-sectional view illustrating a cross section of the dehumidification apparatus 1a taken vertically to the direction of the air flow in the dehumidification apparatus 1a.

As illustrated in FIG. 1, the dehumidification apparatus 1a includes a housing 10, an air inlet 11 provided in an upper part of the housing 10 on a front side thereof, an air outlet 12 provided in the upper part of the housing 10 on a rear side thereof, and a drainage tank 13 in a lower part of the housing 10. Further, as illustrated in FIGS. 2 and 3, a moisture absorption unit 14 and an air-blowing fan 15 are provided inside the housing 10. The moisture absorption unit 14 removes moisture in an air entering through the air inlet 11 of the housing 10, and the resulting air is discharged through the air outlet 12.

In the present embodiment, the air-blowing fan 15 is arranged on a downstream side of the moisture absorption unit 14. However, this is not the only arrangement of the air-blowing fan 15. Alternatively, the air-blowing fan 15 may be arranged on an upstream side of the moisture absorption unit 14 or may be arranged both on the upstream side of the moisture absorption unit 14 and on the downstream side of the moisture absorption unit 14. Further, a filter or dust collector for removing dust or the like in an air, or an ion generator or the like device may be provided in an air flow path from the air inlet 11 to the air outlet 12. Further, the dehumidification apparatus 1a may be used standalone or may be incorporated into other apparatuses including, for example, an air cleaner, an air conditioning apparatus, and a deodorizing apparatus.

The moisture absorption unit 14 includes a rotation motor (driving member) 21, a rotation shaft 22, a substrate 23, a polymeric moisture absorbing material (moisture absorbing material) 24, a heater (heating member) 25, a heat insulating plate 26, and a separation wall 27.

The rotation motor 21 rotates the rotation shaft 22 in response to an instruction from a control section (not illustrated). The control section controls operations of each section in the dehumidification apparatus 1a in response to, for example, an instruction inputted by a user through an operation section (not illustrated), a stored program(s), and detection results obtained by various sensors (not illustrated, including, for example, a temperature sensor) provided in the dehumidification apparatus 1a.

The rotation shaft 22 is arranged so as to extend in a direction from the rear side of the housing 10 to the front side thereof (a direction substantially perpendicular to a direction of flow of an air passing through the housing 10). The rotation shaft 22 is rotatably supported by a housing of the moisture absorption unit 14. The substrate 23 substantially shaped like a disc is attached to the rotation shaft 22. Further, the polymeric moisture absorbing material 24 is applied onto a surface of the substrate 23 on an air inlet 11 side. Note that the polymeric moisture absorbing material 24 may be adhered to the substrate 23 with an adhesive or the like, may be bonded to the substrate 23 with a pin or the like, or may be fixed to the substrate 23 with a frame, a mesh, or the like. Further, in order to improve bondability, the surface of the substrate on which surface the polymeric moisture absorbing material 24 is to be applied may have irregularities or may be roughened. Further, the shapes of the substrate 23 and polymeric moisture absorbing material 24 are not limited to the shapes described above.

As the polymeric moisture absorbing material 24 is used a material (a temperature-sensitive polymeric moisture absorbing material) that exhibits hydrophilicity (moisture absorption property) in a temperature range not higher than a predetermined temperature sensitive point, which is determined depending on a material of the polymeric moisture absorbing material 24, while exhibiting hydrophobicity (dehydration property) in a temperature higher than the temperature sensitive point as a result of phase transition. Note that the temperature-sensitive polymeric moisture absorbing material, which is a dried body, adsorbs and absorbs moisture (water vapor) in the air during moisture absorption. Such a phenomenon is academically referred to as "sorption". On the other hand, a main focus is herein placed on releasing moisture absorbed inside. Thus, a sorption phenomenon that occurs in a temperature not higher than a temperature sensitive point is referred herein to as moisture absorption or water absorption, while a phenomenon where water in liquid form is released in a form of a waterdrop is referred herein to as water release or dehydration (dehydration process).

Specifically, the polymeric moisture absorbing material 24 may be a dried body of, for example, a temperature sensitive polymer such as poly(N-isopropylacrylamide) (PNIPAM) and a derivative thereof, and polyvinyl ether and a derivative thereof. Note that the temperature sensitive point can be adjusted appropriately by preparing a material of a polymeric moisture absorbing material. In the present embodiment, the material of the polymeric moisture absorbing material 24 is so adjusted that the temperature sensitive point falls within a predetermined temperature range higher than a normal temperature (specifically, a predetermined temperature falling within a range of 40° C. to 60° C.). The above-described phenomenon of the polymeric moisture absorbing material 24 (the phenomenon where the polymeric moisture absorbing material 24 exhibits moisture absorption property at a temperature not higher than the temperature sensitive point while exhibiting dehydration property at a temperature higher than the temperature sensitive point) has reversibility. Repeatedly causing a temperature change allows the polymeric moisture absorbing material 24 to repeatedly carry out absorption of moisture contained in an air at a normal temperature and release of a waterdrop by heating. A method by which the polymeric moisture absorbing material 24 is installed is detailed later.

The material of the substrate 23 is not limited to a specific material. Examples of the material of the substrate 23 include resin, metal and ceramic.

The separation wall 27, which is arranged below the rotation shaft 22, separates the moisture absorption unit into a moisture absorption region 14a and a dehydration region 14b. Specifically, the separation wall 27 includes: an opening 27a through which the rotary substrate 23 and the rotary polymeric moisture absorbing material 24 extend; and an opening 27b through which water desorbed from the polymeric moisture absorbing material 24 is to be discharged into the drainage tank 13. The separation wall 27 also separates the dehydration region 14b, except for the openings 27a and 27b, from surrounding regions. Note that a sealing material for improving airtightness between the moisture absorption region 14a and the dehydration region 14b may be provided in the opening 27a at a position between the substrate 23 (or the polymeric moisture absorbing material 24) and the separation wall 27.

The heater 25 is arranged in the dehydration region 14b in such a position so as to face the polymeric moisture absorbing material 24. The heat insulating plate 26 is provided in such a position so as to face the side of the heater 25 which side is opposite to the side thereof facing the polymeric moisture absorbing material 24. The heat insulating plate 26 prevents heat from the heater 25 from being transferred to the separation wall 27 and increases the amount of heat transferred to the polymeric moisture absorbing material 24.

With the above configuration, a rotation driving force of the rotation motor 21 rotates the substrate 23 and the polymeric moisture absorbing material 24, so that the polymeric moisture absorbing material 24 repeatedly moves between the moisture absorption region 14a and the dehydration region 14b. In the moisture absorption region 14a, the temperature of the polymeric moisture absorbing material 24 is not higher than the temperature sensitive point (in the present embodiment, the normal temperature), so that moisture contained in an air passing through the moisture absorption unit 14 is absorbed by the polymeric moisture absorbing material 24. On the other hand, in the dehydration region 14b, the polymeric moisture absorbing material 24 is heated by the heater 25 to a temperature higher than the temperature sensitive point, so that the moisture absorbed by the polymeric moisture absorbing material 24 is released as a waterdrop. Then, the waterdrop released from the polymeric moisture absorbing material 24 is discharged into the drainage tank 13 through the opening 27b, which is provided in a lower part of the dehydration region 14b.

The drainage tank 13 is provided so as to be detachable from the housing 10. This allows water discharged into the drainage tank 13 to be removed as necessary. Note, however, that instead of the drainage tank 13, a drain pipe (not illustrated) or the like may be provided so that water discharged through the opening 27b is drained therethrough out of the housing 10 at any time.

(a) of FIG. 4 is a view illustrating a state of the polymeric moisture absorbing material 24 during moisture absorption in the dehumidification apparatus 1a in accordance with the present embodiment, and (b) of FIG. 4 is a view illustrating a state of the polymeric moisture absorbing material 24 during moisture desorption in the dehumidification apparatus 1a in accordance with the present embodiment. (a) of FIG. 5 is a view illustrating a state of a polymeric moisture absorbing material 24 in accordance with Comparative Example 1 during moisture absorption, and (b) of FIG. 5 is a view illustrating a state of the polymeric moisture absorbing material 24 in accordance with Comparative Example 1 during moisture desorption.

In Comparative Example 1 illustrated in FIG. 5, the polymeric moisture absorbing material 24 has no slits, and the whole polymeric moisture absorbing material 24 is integrally provided over the substrate 23. In this case, as illustrated in (b) of FIG. 5, shrinkage of the polymeric moisture absorbing material 24 during dehydration causes irregular cracks 28 in the polymeric moisture absorbing material 24. This leads to a defect such as peeling of a portion of the polymeric moisture absorbing material 24 from the substrate 23.

That is, the polymeric moisture absorbing material 24 in a hydrophilic state (at a temperature not higher than the temperature sensitive point) is swelled with moisture and thus has an increased volume. On the other hand, the polymeric moisture absorbing material 24 in a hydrophobic state (at a temperature higher than the temperature sensitive point) releases moisture and thus shrinks and has a decreased volume. A shrinkage rate of the polymeric moisture absorbing material 24 in the hydrophobic state varies depending on a material and other factor of the polymeric moisture absorbing material 24, but the volume of the polymeric moisture absorbing material 24 in a shrunk state is approximately 20% to 90% of the volume of that in a swollen state. In order to increase seepage of waterdrops through the surface of the polymeric moisture absorbing material 24 during dehydration, it is preferable to use a polymeric moisture absorbing material 24 made from a material having a high shrinkage rate. A high shrinkage rate, however, tends to cause displacement at a juncture between the polymeric moisture absorbing material 24 and the substrate 23. This may lead to peeling of the polymeric moisture absorbing material 24 from the substrate 23 and/or cracking in the polymeric moisture absorbing material 24.

In contrast, in the present embodiment, as illustrated in FIGS. 3 and 4, the polymeric moisture absorbing material 24 attached to the substrate 23 has many slits (cuts) 24a extending concentrically and radially with respect to the rotation shaft 22. That is, by cutting the polymeric hygroscopic material 24 in a direction parallel to a plate surface of the substrate 23 substantially shaped like a disc, the polymeric hygroscopic material 24 is divided into many small areas (segments).

A method of forming the slits 24a is not limited to a specific method. For example, after the polymeric moisture absorbing material 24 has been formed on the surface of the substrate 23, the slits 24a may be formed by making slits in the polymeric moisture absorbing material 24 with a cutter or the like or may be formed by pressing a mold against the polymeric moisture absorbing material 24. Further, a method of dividing the polymeric moisture absorbing material 24 is not limited to a method of dividing the polymeric moisture absorbing material 24 by cutting the polymeric moisture absorbing material 24 formed on the substrate 23. For example, the small areas may be formed by placing a mold on the substrate 23, pouring a material (precursor) of the polymeric moisture absorbing material 24 into the mold to form the polymeric moisture absorbing material 24, and then removing the mold. An alternative method may be used by which many pieces of polymeric moisture absorbing material 24 are shaped into the small areas and are then adhered to the substrate 23.

With the above configuration, when the polymeric moisture absorbing material 24 shrinks during dehydration, clearances are generated at the slits 24a between the small areas of the polymeric moisture absorbing material 24 (the small areas of the polymeric moisture absorbing material 24 are made apart from each other), as illustrated in (b) of FIG. 4. This reduces stress that acts on the individual small areas of the polymeric moisture absorbing material 24 when the polymeric moisture absorbing material 24 shrinks, and thus makes it possible to prevent the occurrence of irregular cracks. Unfortunately, such irregular cracks can cause variations in moisture absorption rate and amount of dehydration from place to place in the polymeric moisture absorbing material 24 and thus lead to differences in frequency of use from place to place in the polymeric moisture absorbing material 24. This can result in degradation in dehumidification performance (moisture absorption performance and dehydration performance) and degradation in durability. However, the above configuration makes it possible to prevent the occurrence of such degradations.

Thanks to the clearances generated between the individual areas of the polymeric moisture absorbing material 24 during dehydration, it is also possible to increase surface area of the polymeric moisture absorbing material 24 and enhance the efficiency in absorbing moisture.

Further, in the present embodiment, the polymeric moisture absorbing material 24 is so arranged as to extend in an in-plane direction substantially perpendicular to the air flow path from the air inlet 11 to the air outlet 12. This enables enhancement of the dehumidification effect by increasing the proportion of an air in contact with the polymeric moisture absorbing material 24 in the air suctioned into the dehumidification apparatus 1a.

Figure 22:
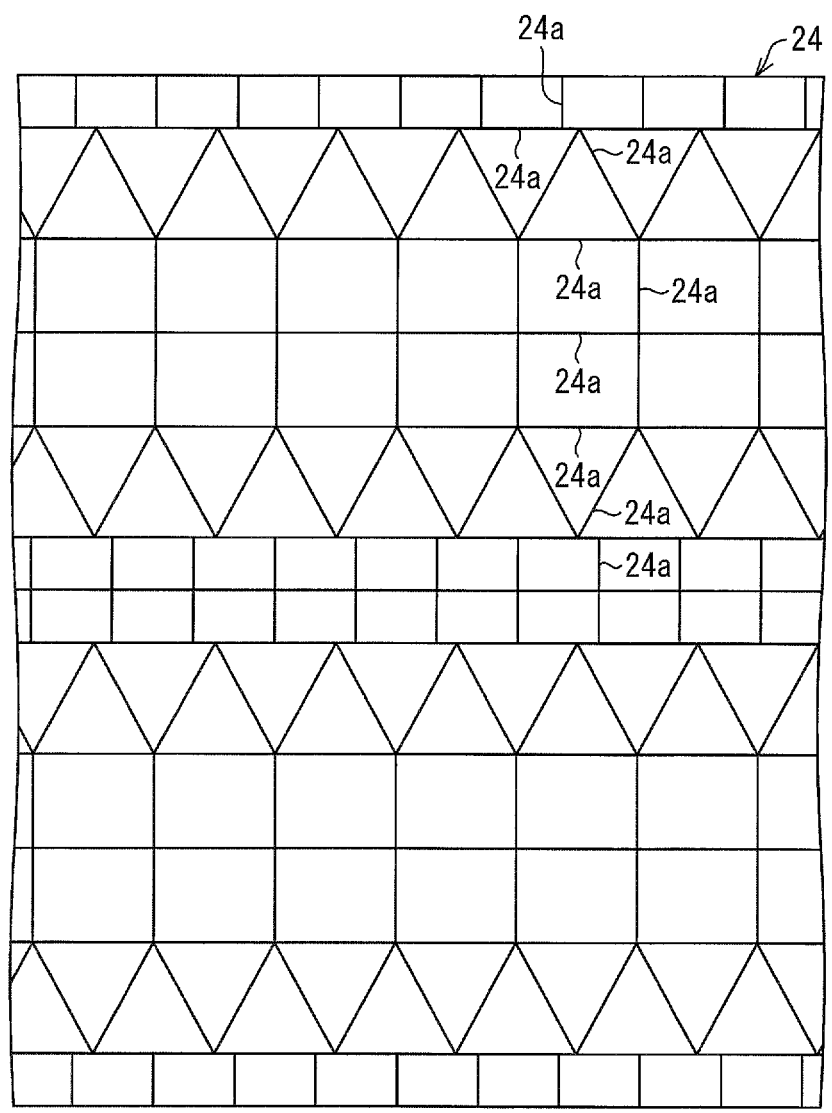
FIG. 22 is a view illustrating a variation of a method of dividing the polymeric moisture absorbing material provided in the dehumidification apparatus illustrated in FIG. 1.

Note that the shape of each of the segments of the polymeric moisture absorbing material 24 is not limited to a specific shape, and each of the segments of the polymeric moisture absorbing material 24 may be shaped like a rectangle, a polygon, an ellipse, a circle, a fan, or the like. It is, however, preferable that the shape of each of the segments be a regularly divided shape. Note that the regularly divided shape does not necessarily mean that all of the segments are identical in shape and/or size. For example, as illustrated in FIG. 22, a group composed of a combination of different segments of different shapes and sizes may be arranged in repeated pattern. The shape and size of each of the segments are so determined as not to produce quickly dried places and slowly dried places, in consideration of the shape of the substrate 23 and the positions of the segments relative to the heater 25.

Regularly dividing the polymeric moisture absorbing material 24 into the segments suppresses temperature unevenness caused by heating with a heater during dehydration. Thus, it is possible to efficiently and stably perform moisture absorption and dehydration with reduced variations in amount of moisture absorption and amount of dehydration across different segments.

Further, the size of each of the segments (the small areas) of the polymeric moisture absorbing material 24 is not limited to a specific size. However, each of the segments (the small areas) of the polymeric moisture absorbing material 24 is preferably in the order of 3 mm to 20 mm square (or 3 mm to 20 mm in inscribed circle diameter) in order to more effectively enhance the moisture absorption effect by increasing the surface area of the polymeric moisture absorbing material 24.

Embodiment 2

Another embodiment of the present invention is described below. Note that, for convenience, members having functions identical to those of the respective members provided in Embodiment 1 are given respective identical reference numerals, and a description of those members is omitted here.

Figure 6:
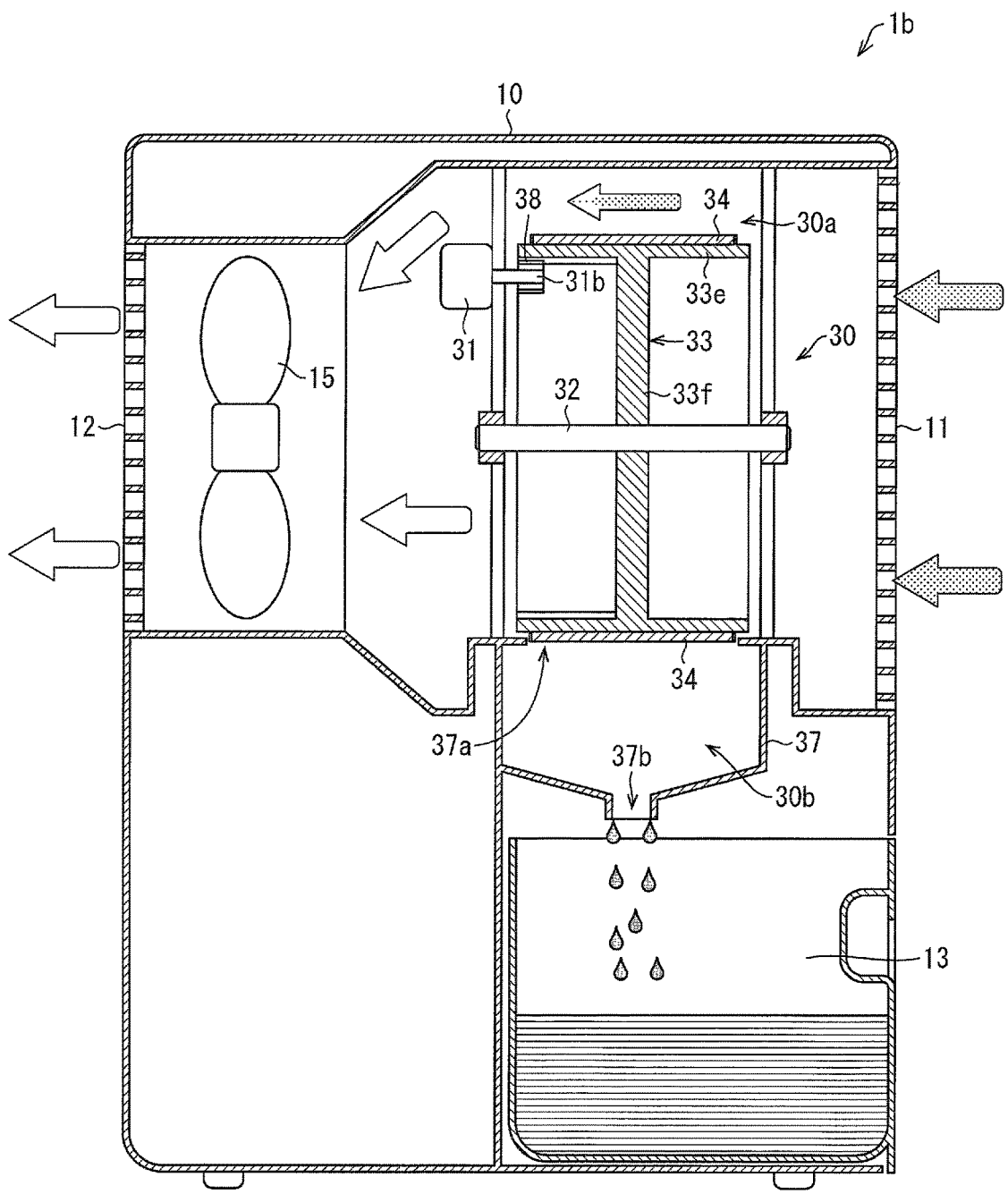
FIG. 6 is a cross-sectional view illustrating a cross section of the dehumidification apparatus in accordance with Embodiment 2 of the present invention, taken parallel to a direction of an air flow in the dehumidification apparatus.
Figure 7:
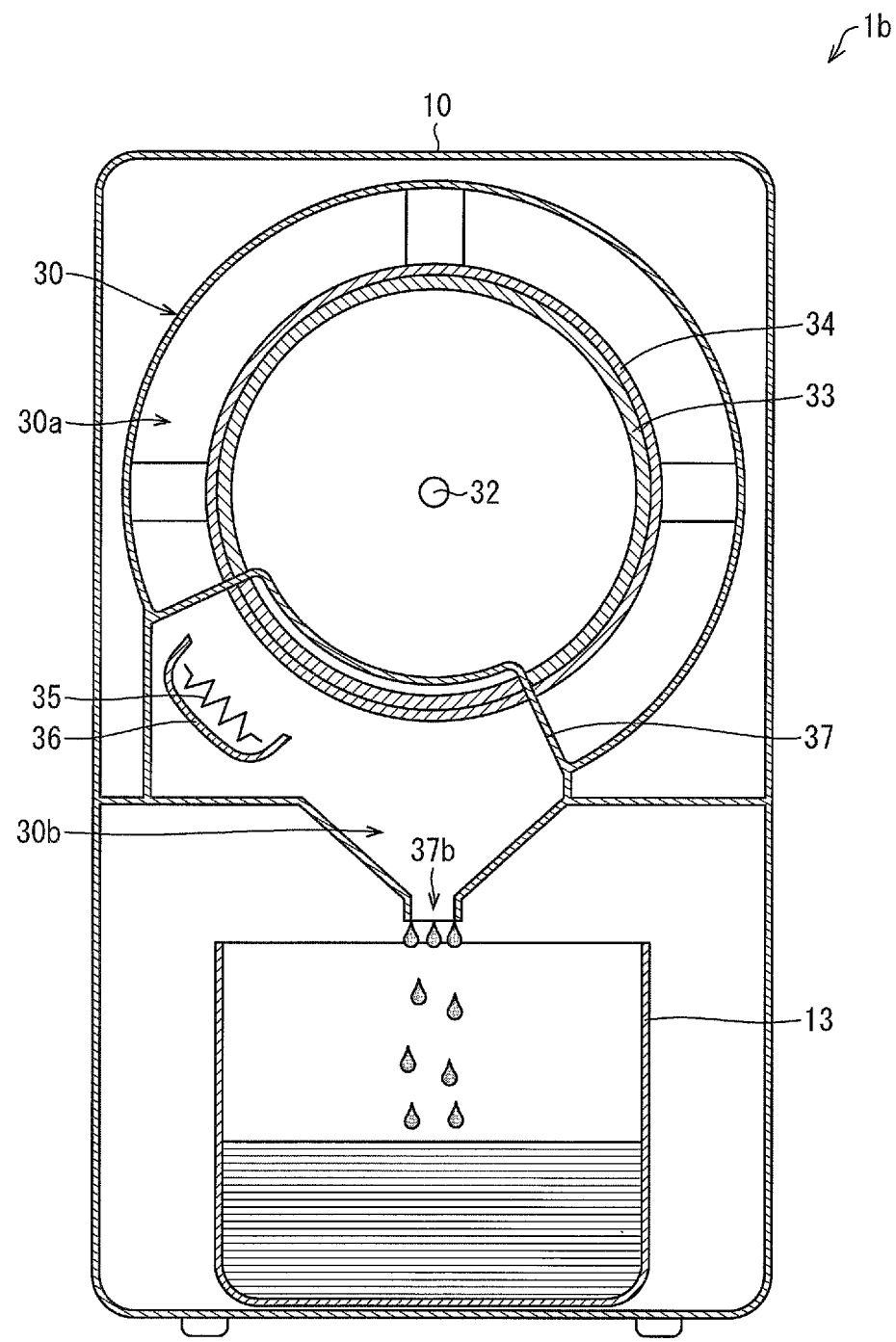
FIG. 7 is a cross-sectional view illustrating a cross section of the dehumidification apparatus illustrated in FIG. 6, taken vertically to the direction of the air flow in the dehumidification apparatus.

FIG. 6 is a cross-sectional view illustrating a cross section of a dehumidification apparatus 1b in accordance with the present embodiment, taken parallel to an air flow direction in the dehumidification apparatus 1b. FIG. 7 is a cross-sectional view illustrating a cross section of the dehumidification apparatus 1b taken vertically to the air flow direction in the dehumidification apparatus 1b.

The dehumidification apparatus 1b has much the same configuration as that of the dehumidification apparatus 1a, except that the dehumidification apparatus 1b includes a moisture absorption unit 30 instead of the moisture absorption unit 14 in the dehumidification apparatus 1a of Embodiment 1.

The moisture absorption unit 30 includes a rotation motor (driving member) 31, rotation shaft 32, a substrate 33, a polymeric moisture absorbing material (moisture absorbing material) 34, a heater (heating member) 35, a heat insulating plate 36, and a separation wall 37.

The substrate 33 has an outer peripheral part 33e of a substantially cylindrical shape and a reinforcing part 33f provided inside the outer peripheral part 33e. The rotation shaft 32 is provided so as to extend along a center of the cylindrical shape and is fixed to the substrate 33. The rotation shaft 32 is arranged so as to extend in a direction from the rear side of the housing 10 to the front side thereof (a direction substantially perpendicular to a direction of flow of an air passing through the housing 10). The rotation shaft 32 is rotatably supported by a housing of the moisture absorption unit 30.

The polymeric moisture absorbing material 34 is applied onto an outer peripheral surface of the outer peripheral part 33e of the substrate 33. Note that the polymeric moisture absorbing material 34 may be adhered to the substrate 33, may be bonded to the substrate 33 with a pin or the like, or may be fixed to the substrate 33 with a frame, a mesh, or the like. Further, in order to improve bondability, the surface of the substrate 23 on which surface the polymeric moisture absorbing material 24 is to be applied may have irregularities or may be roughened. Further, a material of the polymeric moisture absorbing material 34 can be the same as that of the polymeric moisture absorbing material 24 in Embodiment 1.

The rotation motor 31 has a rotation shaft 31b which makes contact with an inner surface of the outer peripheral part 33e of the substrate 33 via a gear (not illustrated). When the rotation motor 31 rotates the rotation shaft 31b, the substrate 33 rotates about the rotation shaft 32 in a direction along a circumference of the substantially cylindrical shape.

The separation wall 37, which is arranged below the substrate 33 and the polymeric moisture absorbing material 34, separates the moisture absorption unit 30 into a moisture absorption region 30a and a dehydration region 30b. Specifically, the separation wall 37 includes: an opening 37a through which the rotary substrate 33 and the rotary polymeric moisture absorbing material 34 extend; and an opening 37b through which water desorbed from the polymeric moisture absorbing material 34 is to be discharged into the drainage tank 13. The separation wall 37 also separates the dehydration region 30b, except for the openings 37a and 37b, from surrounding regions. Note that a sealing material for improving airtightness between the substrate 33 (or the polymeric moisture absorbing material 34) and the separation wall 37 may be provided in the opening 37a.

The heater 35 is arranged in the dehydration region 30b in such a position so as to face the polymeric moisture absorbing material 34. The heat insulating plate 36 is provided in such a position so as to face the side of the heater 35 which side is opposite to the side thereof facing the polymeric moisture absorbing material 34. The heat insulating plate 36 is provided to prevent heat from the heater 35 from being transferred to the separation wall 37 and to increase the amount of heat transferred to the polymeric moisture absorbing material 34.

With the above configuration, a rotation driving force of the rotation motor 31 rotates the substrate 33 and the polymeric moisture absorbing material 34, so that the polymeric moisture absorbing material 34 repeatedly moves between the moisture absorption region 30a and the dehydration region 30b. In the moisture absorption region 30a, the temperature of the polymeric moisture absorbing material 34 is not higher than the temperature sensitive point (in the present embodiment, the normal temperature), so that moisture contained in an air passing through the moisture absorption unit 30 is absorbed by the polymeric moisture absorbing material 34. On the other hand, in the dehydration region 30b, the polymeric moisture absorbing material 34 is heated by the heater 35 to a temperature higher than the temperature sensitive point, so that the moisture absorbed by the polymeric moisture absorbing material 34 is released as a waterdrop. Then, the waterdrop released from the polymeric moisture absorbing material 34 is discharged into the drainage tank 13 through the opening 37b, which is provided in a lower part of the dehydration region 30b.

(a) of FIG. 8 is a view illustrating a state of the polymeric moisture absorbing material 34 during moisture absorption in the dehumidification apparatus 1b in accordance with the present embodiment, and (b) of FIG. 8 is a view illustrating a state of the polymeric moisture absorbing material 34 during moisture desorption in the dehumidification apparatus 1b in accordance with the present embodiment. (a) of FIG. 9 is a view illustrating a state of a polymeric moisture absorbing material 34 in accordance with Comparative Example 2 during moisture absorption, and (b) of FIG. 9 is a view illustrating a state of the polymeric moisture absorbing material 34 in accordance with Comparative Example 2 during moisture desorption.

In Comparative Example 2 illustrated in FIG. 9, the polymeric moisture absorbing material 34 has no slits, and the whole polymeric moisture absorbing material 34 is integrally provided over the substrate 33. In this case, as illustrated in (b) of FIG. 9, shrinkage of the polymeric moisture absorbing material 34 during dehydration causes irregular cracks 38 in the polymeric moisture absorbing material 34. This leads to a defect such as peeling of a portion of the polymeric moisture absorbing material 34 from the substrate 33.

In contrast, in the present embodiment, as illustrated in FIG. 8, the polymeric moisture absorbing material 34 attached to the substrate 33 has many slits 34a extending in circumferential and axial directions of the substrate 33. That is, the polymeric hygroscopic material 34 is divided into many small areas in circumferential and axial directions of the substrate 33.

A method of forming the slits 34a is not limited to a specific method. For example, after the polymeric moisture absorbing material 34 has been formed on the surface of the substrate 33, the slits 34a may be formed by making slits in the polymeric moisture absorbing material 34 with a cutter or the like or may be formed by pressing a mold against the polymeric moisture absorbing material 34. Further, a method of dividing the polymeric moisture absorbing material 34 is not limited to a method of dividing the polymeric moisture absorbing material 34 by cutting the polymeric moisture absorbing material 34 formed on the substrate 33. For example, the small areas may be formed by placing a mold on the substrate 33, pouring a material (precursor) of the polymeric moisture absorbing material 34 into the mold to form the polymeric moisture absorbing material 34, and then removing the mold. An alternative method may be used by which many pieces of polymeric moisture absorbing material 34 are shaped into the small areas and are then adhered to the substrate 33.

With the above configuration, when the polymeric moisture absorbing material 34 shrinks during dehydration, clearances are generated at the slits 34a between the small areas of the polymeric moisture absorbing material 34, as illustrated in (b) of FIG. 8. This reduces stress that acts on the individual small areas of the polymeric moisture absorbing material 34 when the polymeric moisture absorbing material 34 shrinks, and thus makes it possible to prevent the occurrence of irregular cracks. Unfortunately, such irregular cracks can lead to degradation in durability of the polymeric moisture absorbing material 24 and degradation in moisture absorption performance and dehydration performance of the polymeric moisture absorbing material 24. However, the above configuration makes it possible to prevent the occurrence of such degradations.

Thanks to the clearances generated between the individual areas of the polymeric moisture absorbing material 34 during dehydration, it is also possible to increase surface area of the polymeric moisture absorbing material 34 and enhance the efficiency in absorbing moisture.

Further, in the present embodiment, the polymeric moisture absorbing material 34 is arranged along the outer peripheral surface of the substrate 33 having the substantially cylindrical shape. This allows the polymeric moisture absorbing material 34 to be arranged substantially uniformly irrespective of places. Thus, it is possible to efficiently and stably perform moisture absorption and dehydration with reduced variations in amount of moisture absorption and amount of dehydration across different places.

Figure 10:
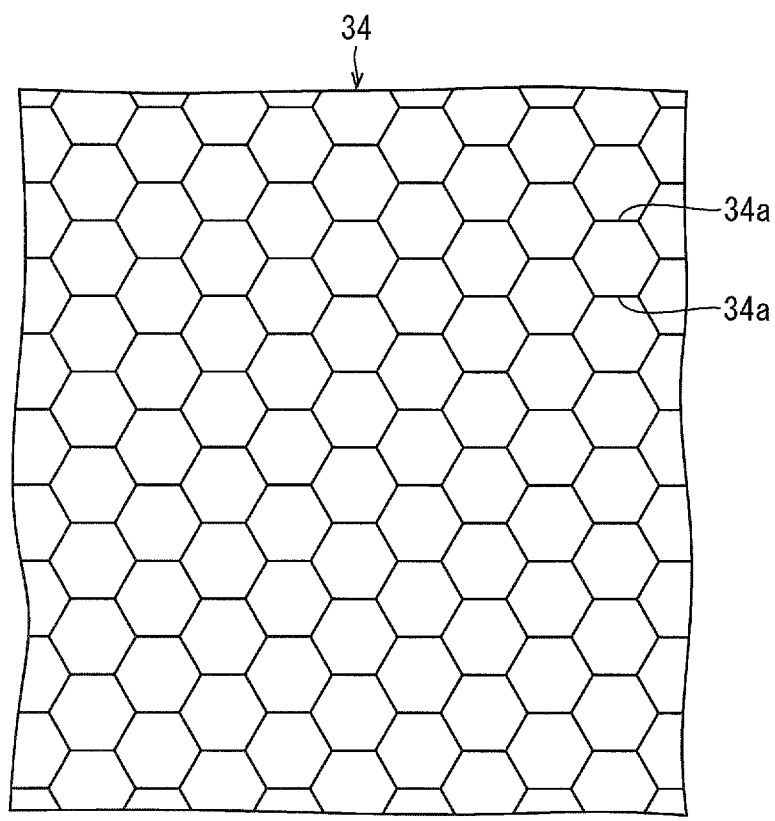
FIG. 10 is a view illustrating a variation of the polymeric moisture absorbing material provided in the dehumidification apparatus illustrated in FIG. 6.

Note that the shape of each of the segments of the polymeric moisture absorbing material 34 is not limited to a specific shape, and each of the segments of the polymeric moisture absorbing material 34 may be formed in any shape. For example, as illustrated in FIG. 10, each of the segments may be formed in hexagonal shape, and slits 34a may be provided so that the segments are arranged in a honeycomb pattern. In this case, the shape of each of the segments is a near-circular shape, and deformations of the segments due to swelling and shrinkage are stabilized. This reduces twists caused by the deformation. Thus, it is possible to stabilize moisture absorption and dehydration in each of the segments.

Further, it is preferable that the shape of each of the segments is a regular shape. Note that the above-described regular shape does not necessarily mean that all of the segments are identical in shape and/or size. For example, as in FIG. 22 described earlier, a group composed of a combination of different segments of different shapes and sizes may be arranged in repeated pattern. The shape and size of each of the segments are so determined as not to produce quickly dried places and slowly dried places, in consideration of the shape of the substrate 23 and the positions of the segments relative to the heater 25.

Regularly dividing the polymeric moisture absorbing material 34 into the segments suppresses temperature unevenness caused by heating with a heater during dehydration. Thus, it is possible to efficiently and stably perform moisture absorption and dehydration with reduced variations in amount of moisture absorption and amount of dehydration across different segments.

Further, the size of each of the segments (the small areas) of the polymeric moisture absorbing material 34 is not limited to a specific size. However, each of the segments (the small areas) of the polymeric moisture absorbing material 34 is preferably in the order of 3 mm to 20 mm square (or 3 mm to 20 mm in inscribed circle diameter) in order to more effectively enhance the moisture absorption effect by increasing the surface area of the polymeric moisture absorbing material 34.

Embodiment 3

Still another embodiment of the present invention is described below. Note that, for convenience, members having functions identical to those of the respective members provided in the aforementioned embodiments are given respective identical reference numerals, and a description of those members is omitted here.

Figure 11:
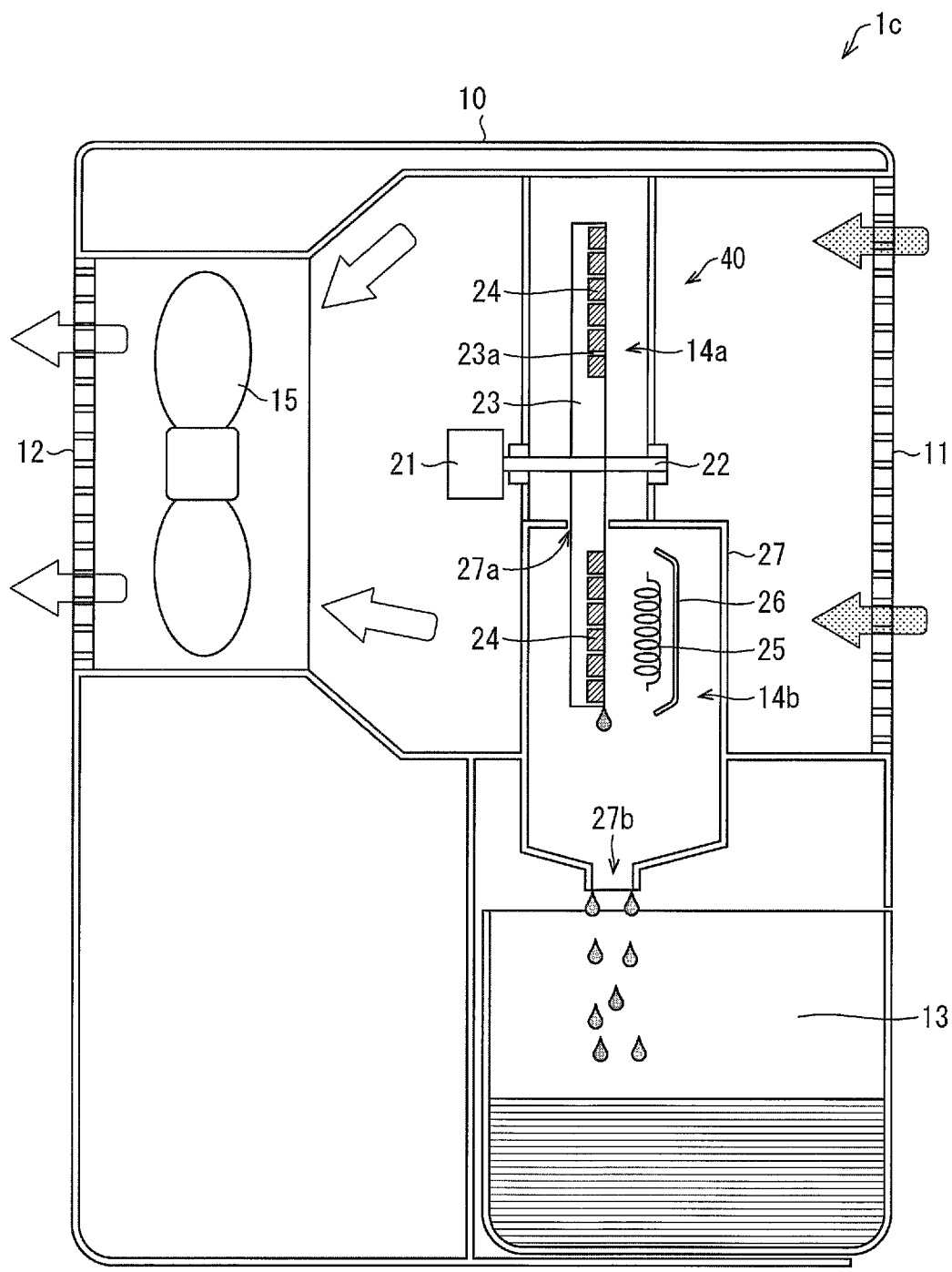
FIG. 11 is a cross-sectional view illustrating a cross section of the dehumidification apparatus in accordance with Embodiment 3 of the present invention, taken parallel to a direction of an air flow in the dehumidification apparatus.

FIG. 11 is a cross-sectional view illustrating a cross section of a dehumidification apparatus 1c in accordance with the present embodiment, taken parallel to an air flow direction in the dehumidification apparatus 1c. FIG. 12 is a cross-sectional view illustrating a cross section of the dehumidification apparatus 1c taken vertically to the air flow direction in the dehumidification apparatus 1c.

The dehumidification apparatus 1c differs from the dehumidification apparatus 1a of Embodiment 1 in that the dehumidification apparatus 1c includes a moisture absorption unit 40 instead of the moisture absorption unit 14. Other configurations of the dehumidification apparatus 1c are the same as those of the dehumidification apparatus 1a.

(a) of FIG. 13 is a view illustrating a state of the polymeric moisture absorbing material 24 during moisture absorption in the dehumidification apparatus 1c in accordance with the present embodiment, and (b) of FIG. 13 is a view illustrating a state of the polymeric moisture absorbing material 24 during moisture desorption in the dehumidification apparatus 1c in accordance with the present embodiment.

In the moisture absorption unit 14 in accordance with Embodiment 1, the polymeric moisture absorbing material 24 is divided into many small areas by slits 24a. In contrast, in the moisture absorption unit 40 of the dehumidification apparatus 1c in accordance with the present embodiment, the polymeric moisture absorbing material 24 is divided into many small areas by frame members 23a, as illustrated in FIG. 13. That is, the moisture absorption unit 40 includes many frame members 23a which are arranged concentrically and radially about the rotation shaft 22. By these frame members 23a, the polymeric moisture absorbing material 24 is divided into many small areas.

Note that the frame members 23a may be formed integrally with the substrate 23 or may be formed independently of the substrate 23 and then attached to the substrate 23. The polymeric moisture absorbing material 24 may be formed by, for example, a method of applying, pouring, or adhering the polymeric moisture absorbing material 24 to small areas defined by the frame members 23a. Alternatively the polymeric moisture absorbing material 24 may be divided into small areas by placing the frame members 23a on the substrate 23 after the polymeric moisture absorbing material 24 has been formed on the substrate 23.

With the dehumidification apparatus 1c in accordance with the present embodiment, it is possible to obtain substantially the same effect as that obtained by the dehumidification apparatus 1a in accordance with Embodiment 1.

The present embodiment has dealt with an example configuration which is a combination of the configuration in which the frame members 23a are provided and the dehumidification apparatus 1a in accordance with Embodiment 1. However, this is not the only possibility. For example, the above configuration may be altered to a configuration, as illustrated in FIG. 14, such that the polymeric moisture absorbing material 34 in the dehumidification apparatus 1b in accordance with Embodiment 2 is divided into many small areas by frame members 33a. With this configuration, it is possible to obtain substantially the same effect as that of the dehumidification apparatus 1b.

Embodiment 4

Yet another embodiment of the present invention is described below. Note that, for convenience, members having functions identical to those of the respective members provided in the aforementioned embodiments are given respective identical reference numerals, and a description of those members is omitted here.

Figure 15:
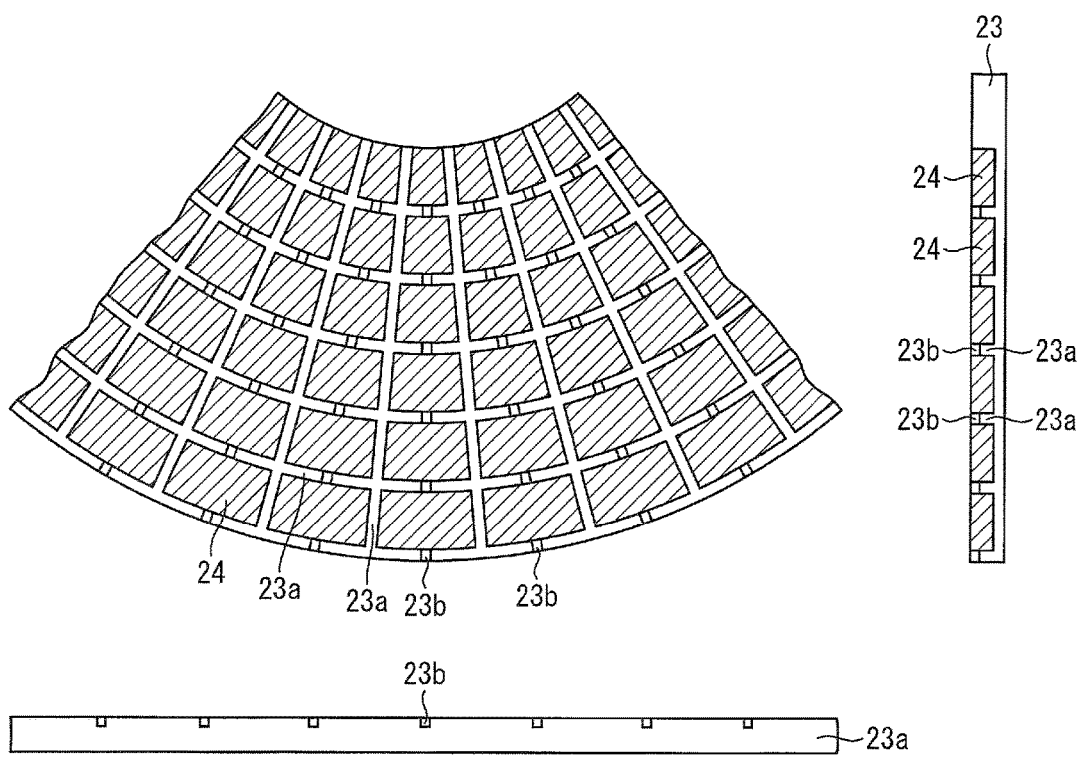
FIG. 15 is a view illustrating an arrangement of a part where the polymeric moisture absorbing material is provided in a dehumidification apparatus in accordance with Embodiment 4 of the present invention.

FIG. 15 is a view illustrating an arrangement of a part where the polymeric moisture absorbing material 24 is provided in a moisture absorption apparatus in accordance with the present embodiment.

As illustrated in FIG. 15, in the present embodiment, of all the frame members 23a provided in the moisture absorption unit 40 of Embodiment 3, some of the frame members 23a which separate the small areas adjacent in a radial direction about the rotation shaft 22 (small areas adjacent in a plumb direction when the polymeric moisture absorbing material 24 is moved into the dehydration region 14b) have grooves 23b provided for communicating the adjacent small areas. Other configurations are the same as those in Embodiment 3.

With this configuration, when the polymeric moisture absorbing material 24 moves into the dehydration region 14b, waterdrops released from the polymeric moisture absorbing material 24 are accelerated to move downward, so that the waterdrops can be effectively discharged into the drainage tank 13.

Note that each of the grooves 23b may be formed by cutting the corresponding frame member 23a from its one end far from the substrate 23 or may be formed by piecing a part of the corresponding frame member 23a.

Embodiment 5

Still another embodiment of the present invention is described below. Note that, for convenience, members having functions identical to those of the respective members provided in the aforementioned embodiments are given respective identical reference numerals, and a description of those members is omitted here.

Figure 16:
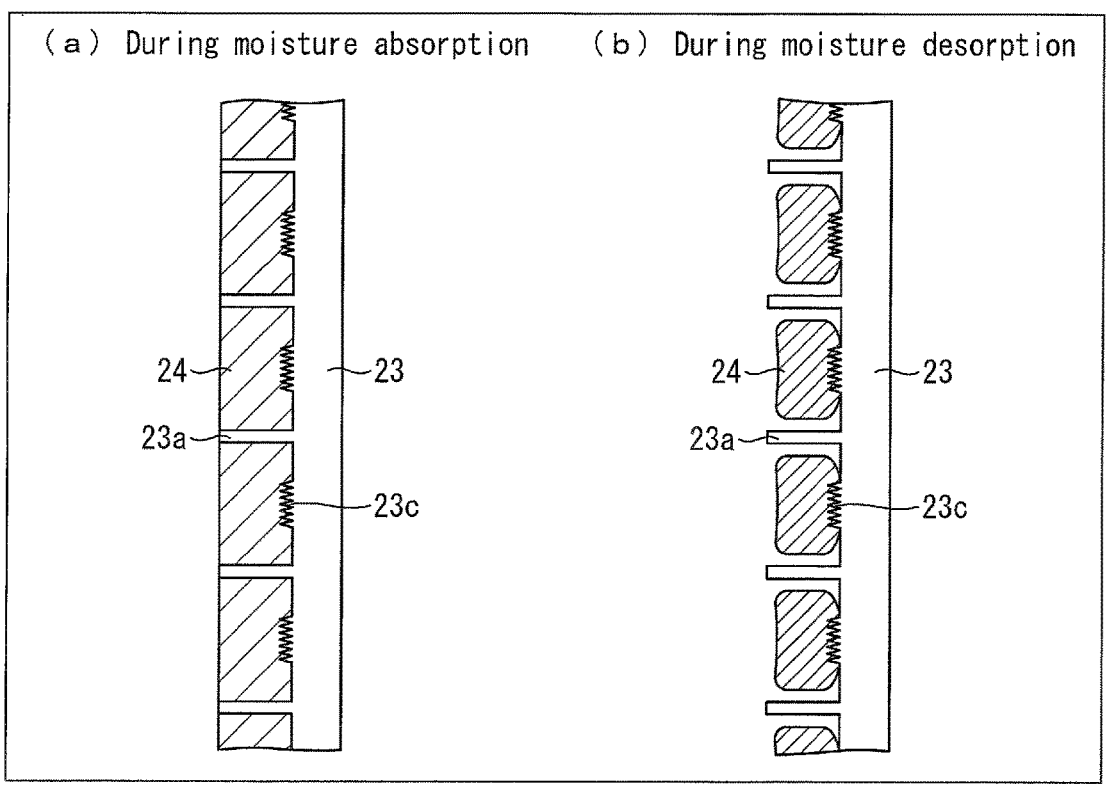
FIG. 16 is a view illustrating an arrangement of a part where the polymeric moisture absorbing material is provided in a dehumidification apparatus in accordance with Embodiment 5 of the present invention.

FIG. 16 is a view illustrating an arrangement of a part where the polymeric moisture absorbing material 24 is provided in a dehumidification apparatus in accordance with the present embodiment.

As illustrated in FIG. 16, in the present embodiment, in each of the small areas which are separated by the frame members 23a of the moisture absorption unit 40 of Embodiment 3, an irregularity (roughened part) 23c is provided in one part of a surface of the substrate 23 which surface makes contact with the polymeric moisture absorbing material 24 (in and near a central part of each of the small areas). Other configurations are the same as those in Embodiment 3.

This enables enhancement of bondability between the substrate 23 and the polymeric moisture absorbing material 24. Thus, it is possible to prevent the polymeric moisture absorbing material 24 from being peeled off from the substrate 23 when the polymeric moisture absorbing material 24 shrinks during dehydration as illustrated in (b) of FIG. 16.

Further, in the present embodiment, the irregularity 23c is provided in and near the central part of each of the small areas, not in a peripheral part thereof. This allows the polymeric moisture absorbing material 24 to shrink, without being restricted by the substrate 23, in and near the peripheral part of each of the small areas. This reduces stress acting between the polymeric moisture absorbing material 24 and the substrate 23 when the polymeric moisture absorbing material 24 shrinks during dehydration. Thus, it is possible to more appropriately prevent the polymeric moisture absorbing material 24 from being peeled off from the substrate 23.

Figure 17:
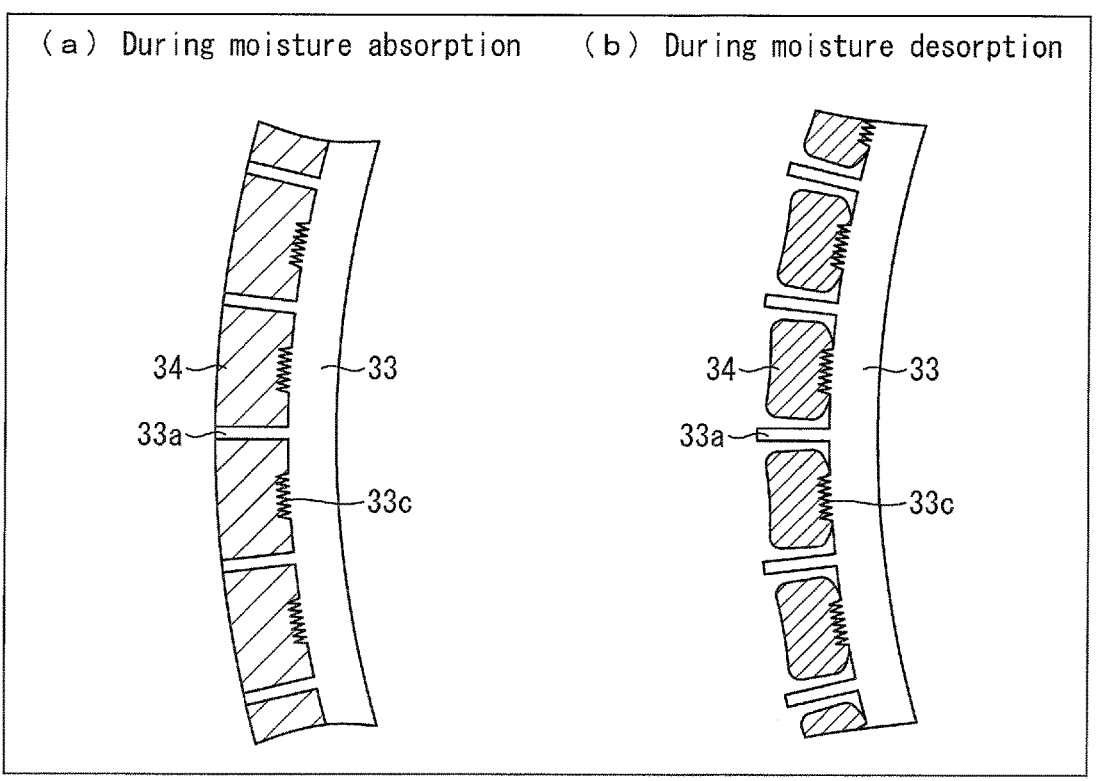
FIG. 17 is a view illustrating an arrangement of a part where the polymeric moisture absorbing material is provided in a variation of the dehumidification apparatus illustrated in FIG. 16.

The present embodiment has dealt with an example configuration which is a combination of the configuration in which the irregularity is provided on a surface of the substrate which surface makes contact with the polymeric moisture absorbing material and the configuration illustrated in FIG. 13. However, this is not the only possibility. For example, as illustrated in FIG. 17, an irregularity 33c may be provided on the surface of the substrate which surface makes contact with the polymeric moisture absorbing material in the configuration illustrated in FIG. 14.

Embodiment 6

Yet another embodiment of the present invention is described below. Note that, for convenience, members having functions identical to those of the respective members provided in the aforementioned embodiments are given respective identical reference numerals, and a description of those members is omitted here.

Figure 18:
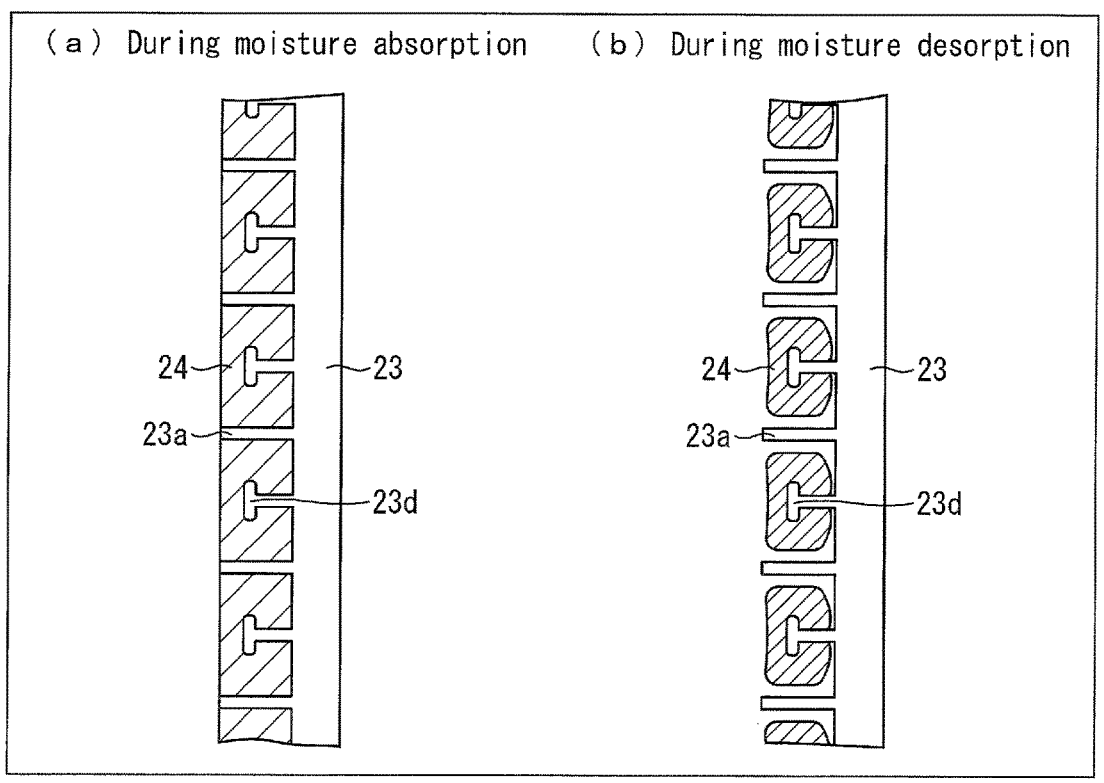
FIG. 18 is a view illustrating an arrangement of a part where the polymeric moisture absorbing material is provided in a dehumidification apparatus in accordance with Embodiment 6 of the present invention.

FIG. 18 is a view illustrating an arrangement of a part where the polymeric moisture absorbing material 24 is provided in a dehumidification apparatus in accordance with the present embodiment.

As illustrated in FIG. 18, in the present embodiment, in each of the small areas which are separated by the frame members 23a of the moisture absorption unit 40 of Embodiment 3, a protrusion 23d is provided in one part of a surface of the substrate 23 which surface makes contact with the polymeric moisture absorbing material 24 (in and/or near a central part of each of the small areas). Other configurations are the same as those in Embodiment 3.

The protrusion 23d is provided so as to protrude through the substrate 23 toward the polymeric moisture absorbing material 24 in and/or near the central part of each of the small areas which are separated by the frame members 23a. Further, the protrusion 23d, which is substantially in the shape of the letter T in cross section, has an extending part and an end part. The extending part extends from the substrate 23 toward the polymeric moisture absorbing material 24, and the end part extends in a direction substantially horizontal to the surface of the substrate 23.

This allows the polymeric moisture absorbing material 24 to be held by the protrusion 23d. Thus, it is possible to prevent the polymeric moisture absorbing material 24 from being peeled off from the substrate 23 when the polymeric moisture absorbing material 24 shrinks during dehydration as illustrated in (b) of FIG. 16.

Further, in the present embodiment, the protrusion 23d is provided in and/or near the central part of each of the small areas. This allows the polymeric moisture absorbing material 24 to shrink, without being restricted by the substrate 23, in and/or near the peripheral part of each of the small areas. This reduces stress acting between the polymeric moisture absorbing material 24 and the substrate 23 when the polymeric moisture absorbing material 24 shrinks during dehydration. Thus, it is possible to more appropriately prevent the polymeric moisture absorbing material 24 from being peeled off from the substrate 23.

Note that the protrusion 23d may be formed integrally with the substrate 23 or may be attached to the substrate 23. Further, the shape of the protrusion 23d is not limited to the above-described shape. The protrusion 23d may be shaped like, for example, the letter L, Y, or I, a wedge, or the like.

Figure 19:
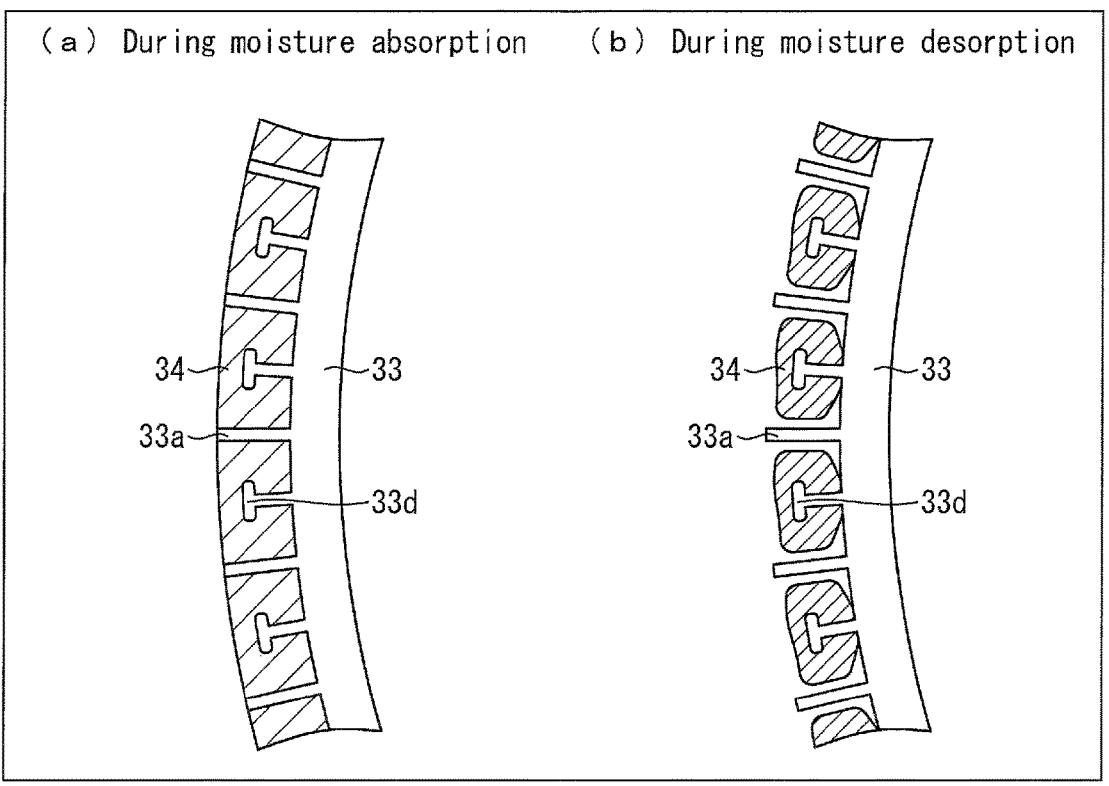
FIG. 19 is a view illustrating an arrangement of a part where the polymeric moisture absorbing material is provided in a variation of the dehumidification apparatus illustrated in FIG. 18.

The present embodiment has dealt with an example configuration which is a combination of the configuration in which the protrusion 23d is provided on a surface of the substrate which surface makes contact with the polymeric moisture absorbing material and the configuration illustrated in FIG. 13. However, this is not the only possibility. For example, as illustrated in FIG. 19, a protrusion 33d may be provided on the surface of the substrate which surface makes contact with the polymeric moisture absorbing material in the configuration illustrated in FIG. 14.

Embodiment 7

Still another embodiment of the present invention is described below. Note that, for convenience, members having functions identical to those of the respective members provided in the aforementioned embodiments are given respective identical reference numerals, and a description of those members is omitted here.

Figure 20:
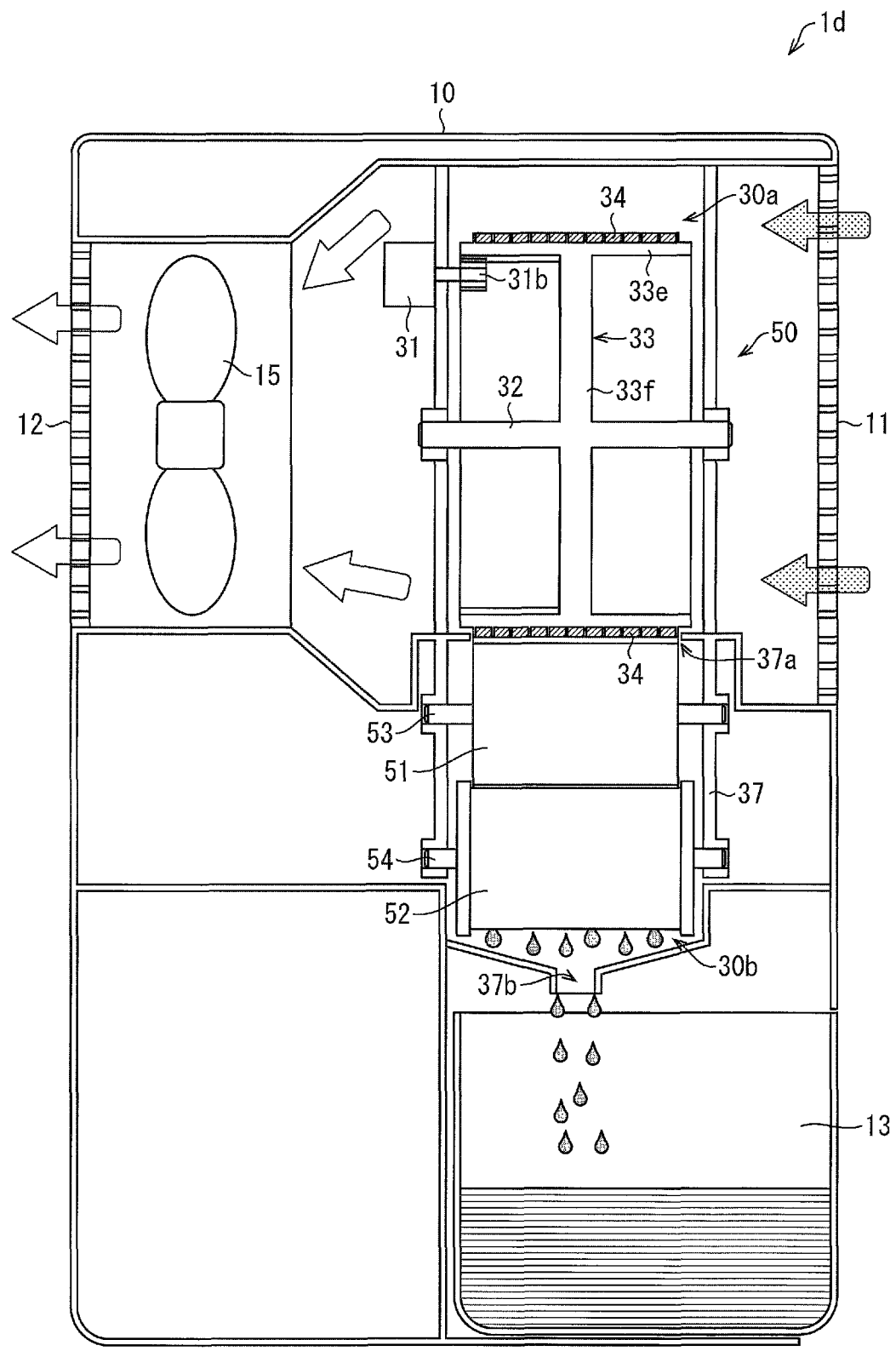
FIG. 20 is a cross-sectional view illustrating a cross section of the dehumidification apparatus in accordance with Embodiment 7 of the present invention, taken parallel to a direction of an air flow in the dehumidification apparatus.
Figure 21:
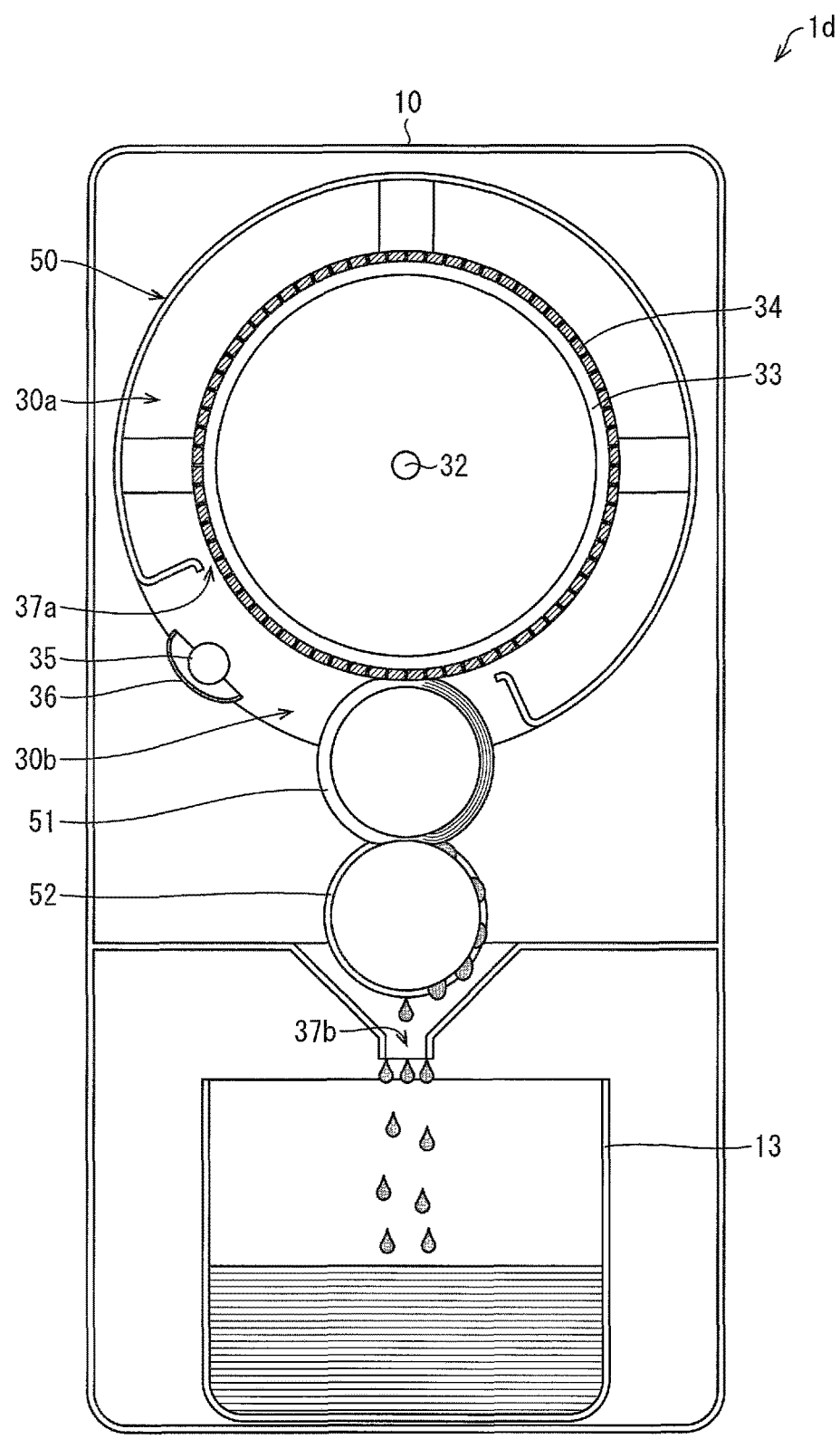
FIG. 21 is a cross-sectional view illustrating a cross section of the dehumidification apparatus illustrated in FIG. 20, taken vertically to the direction of the air flow in the dehumidification apparatus.

FIGS. 20 and 21 are cross-sectional views of a dehumidification apparatus 1d in accordance with the present embodiment.

As illustrated in FIGS. 20 and 21, a dehumidification apparatus 1d in accordance with the present embodiment includes a moisture absorption unit 50 instead of the moisture absorption unit 30 of the dehumidification apparatus 1b of Embodiment 2. The moisture absorption unit 50 includes not only the components of the moisture absorption unit 30, but also a moisture absorption roller (second moisture absorbing material) 51 and a compression roller 52.

The moisture absorption roller 51 is a member, of a substantially cylindrical shape, having a moisture absorbent material (second moisture absorbing material) formed on an outer peripheral surface thereof. The moisture absorption roller 51 is arranged so as to make contact with the polymeric moisture absorbing material 24 from below in a plumb direction in the dehydration region 30b. Further, moisture absorption roller 51 is rotatably supported by a rotation shaft 53. A material of the moisture absorbent material arranged around the outer peripheral surface of the moisture absorption roller 51 is not limited to a specific material, provided that the moisture absorbent material has water absorbency during decompression and a property of releasing absorbed moisture as a result of compression. The material of the moisture absorbent material can be a conventionally publicly-known material, such as felt, a nonwoven fabric, or a soft resin foam.

The compression roller 52 is a member, of a substantially cylindrical shape, having a non-moisture absorbent material formed on an outer peripheral surface thereof. The compression roller 52 is arranged so as to be pressed against the moisture absorption roller 51 at a predetermined pressure from below in a plumb direction in the dehydration region 30b. Further, the compression roller 52 is rotatably supported by a rotation shaft 54.

With this configuration, when the substrate 33 and the polymeric moisture absorbing material 34 are rotated by a driving force of the rotation motor 31, the moisture absorption roller 51 and the compression roller 52 rotate correspondingly. Note that the moisture absorption roller 51 and the compression roller 52 may be rotated by a driving means that differs from the rotation motor 31.

Further, waterdrops heated by the heater 35 and released from the polymeric moisture absorbing material 34 are absorbed by the moisture absorbing material on the surface of the moisture absorption roller 51 which makes contact with the polymeric moisture absorbing material 34. Then, when the surface of the moisture absorption roller 51 absorbing the water released from polymeric moisture absorbing material 34 is rotated to a position that faces the compression roller 52, the water absorbed by the moisture absorption roller 51 is squeezed by a pressing force produced by the moisture absorption roller 51 and the compression roller 52, and then moves in the compression roller 52 and discharged through the opening 37b of the separation wall 37 into the drainage tank 13.

This allows the moisture absorbed by the polymeric moisture absorbing material 34 to be more effectively discharged and collected.

Note that as illustrated in FIG. 14, 17, or 19, the polymeric moisture absorbing material 34 may be divided into many small areas by the frame members 33a in such a manner that a height of the frame members 33a from the surface of the substrate 33 is set to be not larger than a thickness of the polymeric moisture absorbing material 34. With this configuration, the frame members 33a prevent a load having a value not less than a predetermined value to be applied on the polymeric moisture absorbing material 34 by a pressing force of the moisture absorption roller 51. Thus, it is possible to prevent damage to the polymeric moisture absorbing material 34.

[Recap]

A dehumidification apparatus (1a to 1d) in accordance with Aspect 1 of the present invention includes: a substrate (23, 33); a moisture absorbing material (polymeric moisture absorbing materials 24 and 34) attached to the substrate (23, 33); and a driving member (rotation motors 21 and 31) which repeatedly moves the moisture absorbing material (polymeric moisture absorbing materials 24 and 34) between a moisture absorption region (14a, 30a) and a dehydration region (14b, 30b), the dehumidification apparatus (1a to 1d) allowing moisture absorbed by the moisture absorbing material (polymeric moisture absorbing materials 24 and 34) in the moisture absorption region (14a, 30a) to be desorbed in the dehydration region (14b, 30b), the moisture absorbing material (polymeric moisture absorbing materials 24 and 34) being made from a material that absorbs moisture and swells at a temperature not higher than a predetermined temperature sensitive point, while shrinking and releasing water in liquid form at a temperature higher than the temperature sensitive point, the dehumidification apparatus further comprising a heating member (heaters 25 and 35) which heats the moisture absorbing material (polymeric moisture absorbing materials 24 and 34) to the temperature higher than the temperature sensitive point in the dehydration region (14b, 30b), the moisture absorbing material (polymeric moisture absorbing materials 24 and 34) being divided into a plurality of segments on the substrate (23, 33).

The above configuration uses the moisture absorbing material that absorbs moisture and swells at a temperature not higher than a predetermined temperature sensitive point, while shrinking and releasing water at a temperature higher than the temperature sensitive point. Unlike the conventional desiccant dehumidification apparatus described earlier, the dehumidification apparatus having the above configuration eliminates the need for the heating treatment for allowing moisture adsorbed by the moisture absorbing material to be released as water vapor and the cooling treatment for changing water vapor released from the moisture absorbing material into water. Thus, it is possible to enhance energy efficiency. Further, with the moisture absorbing material (polymeric moisture absorbing materials 24 and 34) divided into a plurality of segments, clearances are generated between the individual segments of the moisture absorbing material (polymeric moisture absorbing materials 24 and 34) during dehydration. This makes it possible to increase surface area of the moisture absorbing material (polymeric moisture absorbing materials 24 and 34), thereby enhancing the efficiency in absorbing moisture. Further, the moisture absorbing material (polymeric moisture absorbing materials 24 and 34) divided into a plurality of segments reduces stress acting on the moisture absorbing material (polymeric moisture absorbing materials 24 and 34) when the moisture absorbing material (polymeric moisture absorbing materials 24 and 34) shrinks during dehydration. This makes it possible to prevent the occurrence of irregular cracks in the moisture absorbing material (polymeric moisture absorbing materials 24 and 34).

In the above-described Aspect 1, a dehumidification apparatus (1a, 1b) in accordance with Aspect 2 of the present invention is configured such that adjacent ones of the segments in the moisture absorbing material (polymeric moisture absorbing materials 24 and 34) are separated by cuts (24a). Note that the cuts (24a) may be formed by cutting the moisture absorbing material (polymeric moisture absorbing materials 24 and 34) arranged on the substrate (23, 33) or may be formed by forming the moisture absorbing material (polymeric moisture absorbing materials 24 and 34) into a plurality of pieces having a shape(s) corresponding to the individual segments and then attaching the moisture absorbing material (polymeric moisture absorbing materials 24 and 34) to the substrate (23, 33).

With the above configuration, it is possible to easily form the moisture absorbing material (polymeric moisture absorbing materials 24 and 34) divided into a plurality of segments. It is also possible to accelerate movement of water released from the moisture absorbing material (polymeric moisture absorbing materials 24 and 34) in the dehydration region (14b, 30b), so that the water can be effectively discharged.

In the above-described Aspect 1, a dehumidification apparatus (1c, 1d) in accordance with Aspect 3 of the present invention is configured such that frame members (23a, 33a) defining the segments are provided between adjacent ones of the segments. Note that the moisture absorbing material (polymeric moisture absorbing materials 24 and 34) may be formed within each segment defined by the frame member (23a, 33a). Alternatively, the moisture absorbing material (polymeric moisture absorbing materials 24 and 34) formed in a plurality of pieces having a shape(s) corresponding to the individual segments may be attached to the respective segments. Further, the frame members (23a, 33a) may be formed integrally with the substrate (23, 33) or may be attached to the substrate (23, 33).

With the above configuration, it is possible to easily form the moisture absorbing material (polymeric moisture absorbing materials 24 and 34) divided into a plurality of segments.

In the above-described Aspect 3, a dehumidification apparatus (1d) in accordance with Aspect 4 of the present invention is configured to include a second moisture absorbing material (moisture absorption roller 51), making contact with the moisture absorbing material (polymeric moisture absorbing material 34) in the dehydration region (30b), which absorbs water released from the moisture absorbing material (polymeric moisture absorbing material 34), wherein a height of the frame members (33a) from the substrate (33) is not larger than a thickness of the moisture absorbing material (polymeric moisture absorbing material 34).

The above configuration enables the second moisture absorbing material (moisture absorption roller 51) to effectively remove water desorbed from the moisture absorbing material (polymeric moisture absorbing material 34).

In the above-described Aspect 3 or 4, a dehumidification apparatus (1c) in accordance with Aspect 5 of the present invention is configured such that the frame members (23a), which define the segments arranged adjacent to each other in a plumb direction when the moisture absorbing material (polymeric moisture absorbing material 24, 34) is moved into the dehydration region (14b), have grooves (23b) provided for communicating the adjacent segments.

With this configuration, waterdrops released from the moisture absorbing material (polymeric moisture absorbing material 24) are accelerated to move downward, so that the waterdrops can be effectively discharged.

In any one of the above-described Aspects 1 to 5, a dehumidification apparatus in accordance with Aspect 6 of the present invention is configured such that irregularities (23c, 33c), or protrusions (23d, 33d) inserted into the moisture absorbing material (polymeric moisture absorbing material 24, 34), are provided in the respective segments on a surface of the substrate (23, 33) which surface makes contact with the moisture absorbing material (polymeric moisture absorbing material 24, 34).

With the above configuration, the irregularities (23c, 33c) or the protrusions (23d, 33d) increase a force of bonding between the moisture absorbing material (polymeric moisture absorbing material 24, 34) and the substrate (23, 33). This makes it possible to prevent the moisture absorbing material (polymeric moisture absorbing material 24, 34) from being peeled off from the substrate (23, 33).

Note that the irregularities (23c, 33c) or the protrusions (23d, 33d) may be provided only in one part of the surface of the substrate which surface makes contact with the moisture absorbing material (for example, in central parts of the segments). This reduces stress that acts between the moisture absorbing material (polymeric moisture absorbing material 24, 34) and the substrate (23, 33) when the moisture absorbing material (polymeric moisture absorbing material 24, 34) shrinks during dehydration. Thus, it is possible to more appropriately prevent the moisture absorbing material (polymeric moisture absorbing material 24, 34) from being peeled off from the substrate (23, 33).

The present invention is not limited to the description of the embodiments above, but may be altered by a skilled person within the scope of the claims. Any embodiment based on a proper combination of technical means disclosed in different embodiments is also encompassed in the technical scope of the present invention. Further, a new technical feature can be achieved by combining technical means disclosed in different embodiments.

INDUSTRIAL APPLICABILITY

The present application is applicable to a dehumidification apparatus using a moisture absorbing material exhibiting moisture absorption property in a temperature range not higher than a predetermined temperature sensitive point, while exhibiting dehydration property in a temperature range higher than the predetermined temperature sensitive point.

REFERENCE SIGNS LIST

1a to 1d Dehumidification apparatus
14, 30, 40, 50 Moisture absorption unit 14a, 30a Moisture absorption region
14b, 30b Dehydration region
21, 31 Rotation motor (driving member)
23, 33 Substrate
23a, 33a Frame member
23b Groove
23c, 33c Irregularity
23d, 33d Protrusion
24, 34 Polymeric moisture absorbing material (moisture absorbing material)
24a Slit (cut)
25, 35 Heater (heating member)
51 Moisture absorption roller (second moisture absorbing material)
52 Compression roller

The invention claimed is:

1. A dehumidification apparatus comprising:
a substrate;
a moisture absorbing material attached to the substrate; and
a driving member which repeatedly moves the moisture absorbing material between a moisture absorption region and a dehydration region,
the dehumidification apparatus allowing moisture absorbed by the moisture absorbing material in the moisture absorption region to be released in the dehydration region,
the moisture absorbing material being made from a material that absorbs moisture and swells at a temperature not higher than a predetermined temperature sensitive point, while shrinking and releasing water in liquid form at a temperature higher than the temperature sensitive point,
the dehumidification apparatus further comprising a heating member which heats the moisture absorbing material to the temperature higher than the temperature sensitive point in the dehydration region,
the moisture absorbing material being divided into a plurality of segments on the substrate, and
configured such that the moisture being discharged from the moisture absorbing material as a waterdrop in the dehydration region.

2. The dehumidification apparatus according to claim 1, wherein
adjacent ones of the segments in the moisture absorbing material are separated by cuts.

3. The dehumidification apparatus according to claim 1, wherein
frame members defining the segments are provided between adjacent ones of the segments.

4. The dehumidification apparatus according to claim 3, further comprising:
a second moisture absorbing material, making contact with the moisture absorbing material in the dehydration region, which absorbs water released from the moisture absorbing material,
wherein a height of the frame members from the substrate is not larger than a thickness of the moisture absorbing material.

5. The dehumidification apparatus according to claim 3, wherein
the frame members which define the segments arranged adjacent to each other in a plumb direction when the moisture absorbing material is moved into the dehydration region, have grooves provided for communicating the adjacent segments.

6. The dehumidification apparatus according to claim 1, wherein
irregularities, or protrusions inserted into the moisture absorbing material, are provided in the respective segments on a surface of the substrate which surface makes contact with the moisture absorbing material.

7. A dehumidification apparatus comprising:
a substrate;
a moisture absorbing material attached to the substrate; and
a driving member which repeatedly moves the moisture absorbing material between a moisture absorption region and a dehydration region,
the dehumidification apparatus allowing moisture absorbed by the moisture absorbing material in the moisture absorption region to be released in the dehydration region,
the moisture absorbing material being made from a material that absorbs moisture and swells at a temperature not higher than a predetermined temperature sensitive point, while shrinking and releasing water in liquid form at a temperature higher than the temperature sensitive point,
the dehumidification apparatus further comprising a heating member which heats the moisture absorbing material to the temperature higher than the temperature sensitive point in the dehydration region,
the moisture absorbing material being divided into a plurality of segments on the substrate, and
adjacent ones of the segments in the moisture absorbing material being separated by cuts.

8. A dehumidification apparatus comprising:
a substrate;
a moisture absorbing material attached to the substrate; and
a driving member which repeatedly moves the moisture absorbing material between a moisture absorption region and a dehydration region,
the dehumidification apparatus allowing moisture absorbed by the moisture absorbing material in the moisture absorption region to be released in the dehydration region,
the moisture absorbing material being made from a material that absorbs moisture and swells at a temperature not higher than a predetermined temperature sensitive point, while shrinking and releasing water in liquid form at a temperature higher than the temperature sensitive point,
the dehumidification apparatus further comprising a heating member which heats the moisture absorbing material to the temperature higher than the temperature sensitive point in the dehydration region,
the moisture absorbing material being divided into a plurality of segments on the substrate,
frame members defining the segments being provided between adjacent ones of the segments,
the dehumidification apparatus further comprising a second moisture absorbing material, making contact with the moisture absorbing material in the dehydration region, which absorbs water released from the moisture absorbing material, and
a height of the frame members from the substrate being not larger than a thickness of the moisture absorbing material.

* * * * *